United States Patent [19]
Soltan et al.

[11] Patent Number: 6,052,100
[45] Date of Patent: Apr. 18, 2000

[54] COMPUTER CONTROLLED THREE-DIMENSIONAL VOLUMETRIC DISPLAY

[75] Inventors: Parviz Soltan, San Diego; John A. Trias, La Mesa; Weldon J. Dahlke, San Diego, all of Calif.; Robert V. Belfatto, Melbourne Beach; Frank Sanzone, Satellite Beach, both of Fla.; Christopher J. Poulos; Neil P. Acantilado, both of San Diego, Calif.

[73] Assignee: The United States of America represented by the Secertary of the Navy, Washington, D.C.

[21] Appl. No.: 08/926,854

[22] Filed: Sep. 10, 1997

Related U.S. Application Data

[63] Continuation-in-part of application No. 08/726,305, Oct. 2, 1996, Pat. No. 5,945,966, application No. 08/431,197, Apr. 27, 1995, abandoned, and application No. 08/687,091, May 3, 1995, Pat. No. 5,854,613, which is a continuation of application No. 08/215,798, Mar. 16, 1994, abandoned.

[51] Int. Cl.[7] ................................................. G09G 5/00
[52] U.S. Cl. .................................... 345/6; 345/84
[58] Field of Search .............................. 345/84, 87, 108, 345/516, 6, 31, 32, 95; 348/740, 790, 792

[56] References Cited

U.S. PATENT DOCUMENTS

| | | |
|---|---|---|
| 4,023,158 | 5/1977 | Corcoran . |
| 4,086,632 | 4/1978 | Lions . |
| 4,160,973 | 7/1979 | Berlin, Jr. . |
| 4,740,779 | 4/1988 | Cleary et al. . |
| 4,799,103 | 1/1989 | Mukerheide . |
| 4,881,068 | 11/1989 | Korevaar et al. . |
| 4,922,336 | 5/1990 | Morton . |
| 5,015,188 | 5/1991 | Pellosie, Jr. et al. . |
| 5,024,494 | 6/1991 | Williams et al. . |
| 5,042,909 | 8/1991 | Garcia, Jr. et al. . |
| 5,082,350 | 1/1992 | Garcia et al. . |
| 5,162,787 | 11/1992 | Thompson et al. . |

OTHER PUBLICATIONS

"Laser–Based 3D Volumetric Display System", Parviz Soltan et al, 93 Tech Net, Jun. 8–10, 1993.

"Laser Based 3D Volumetric Display System", Parviz Soltan et al, SPIE, Feb. 9–14, 1992.

"Laser–Based Display Technology Development At The Naval Ocean Systems Center NOSC", Thomas Phillips et al, SPIE vol. 1454 Beam Deflection and Scanning Technologies (1991).

"P3–5 3 Display Using Laser and Moving Screen", H. Yamada et al, Japan Display '89.

"A 1075–Line Video–Rate Laser–Addressed Liquid–Crystal Light–Valve Projection Display", J. Trias et al, SID vol. 29 No. 4 1988.

"A Real–Time Autostereoscopic Multiplanar 3D Display System", Rodney Don Williams et al, SID 88 Digest.

Dynamic Transparent Pages in a Volumetric 3D/4D Display, Steve E. Wixson, Electonic Imaging '86.

"A Laser–Based Three–Dimensional Display", Uwe Brinkmann, Lasers and Applications Mar. 1983.

"Image Quality of Volumetric Displays: Emerging Technology and Needed Research", Rodney Don Williams et al, SID 91 Digest.

"At SID, Lasers Put New Spin on 3D Displays", Technology Trends, Aug. 1988.

*Primary Examiner*—Chanh Nguyen
*Attorney, Agent, or Firm*—Henry Fendelman; Michael A. Kagan; Eric James Whitesell

[57] ABSTRACT

A three dimensional display system comprises a display volume selectively partitioned into distinct display regions, a display surface for scattering light beams from the display volume, at least two optical scanners for modulating the light beams and for directing the light beams to the display surface within each distinct display region respectively, and a display controller. The display controller comprises a world coordinate interface for inputting world coordinates, a data processor for transforming the world coordinates into view coordinates and device coordinates, and an optical scanner controller for sensing and controlling the motion of the display surface and for outputting the device coordinates to the optical scanners to generate a three dimensional image within the display volume.

2 Claims, 22 Drawing Sheets

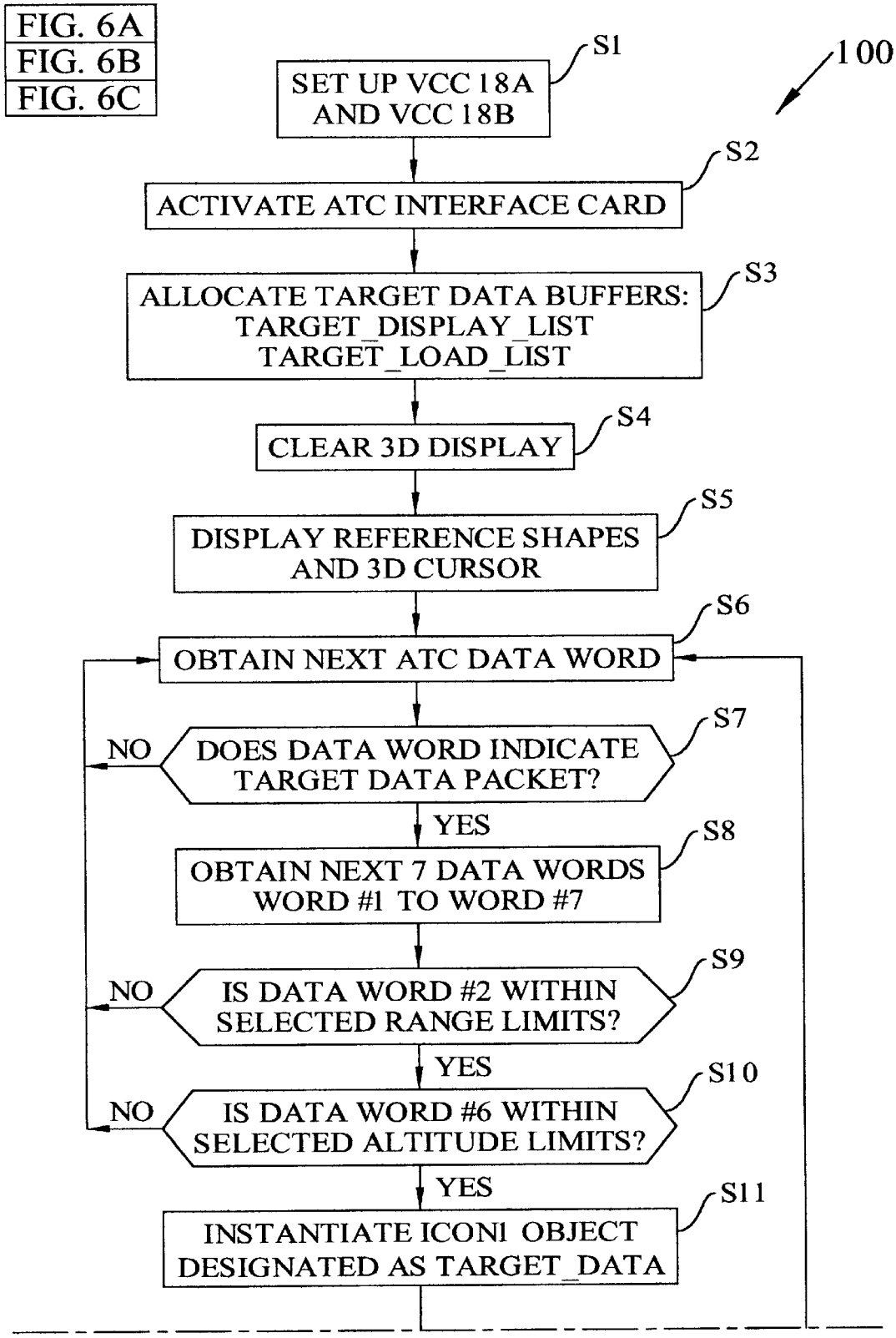

FIG. 7

| FIG. 7A |
| FIG. 7B |

FIG. 7A

FROM S21

S22

SET CURRENT_TARGET EQUAL TO FIRST
ICON1 OBJECT IN TARGET_DISPLAY_LIST
— S22a

IS CURRENT_TARGET.SIF_ID = SIF_INTERROGATE? — NO
S22b     YES

INSTANTIATE ICON2 OBJECT DESIGNATED
AS INTERROGATED_TARGET
— S22c

SET INTERROGATED_TARGET.SIF_ID =
CURRENT_TARGET.SIF_ID
— S22d

SET INTERROGATED_TARGET.AZIMUTH =
CURRENT_TARGET.AZIMUTH
— S22e

SET INTERROGATED_TARGET.RANGE =
CURRENT_TARGET.RANGE
— S22f

SET INTERROGATED_TARGET.ALTITUDE =
CURRENT_TARGET.ALTITUDE
— S22g

SET INTERROGATED_TARGET.LOCATION =
— S22h

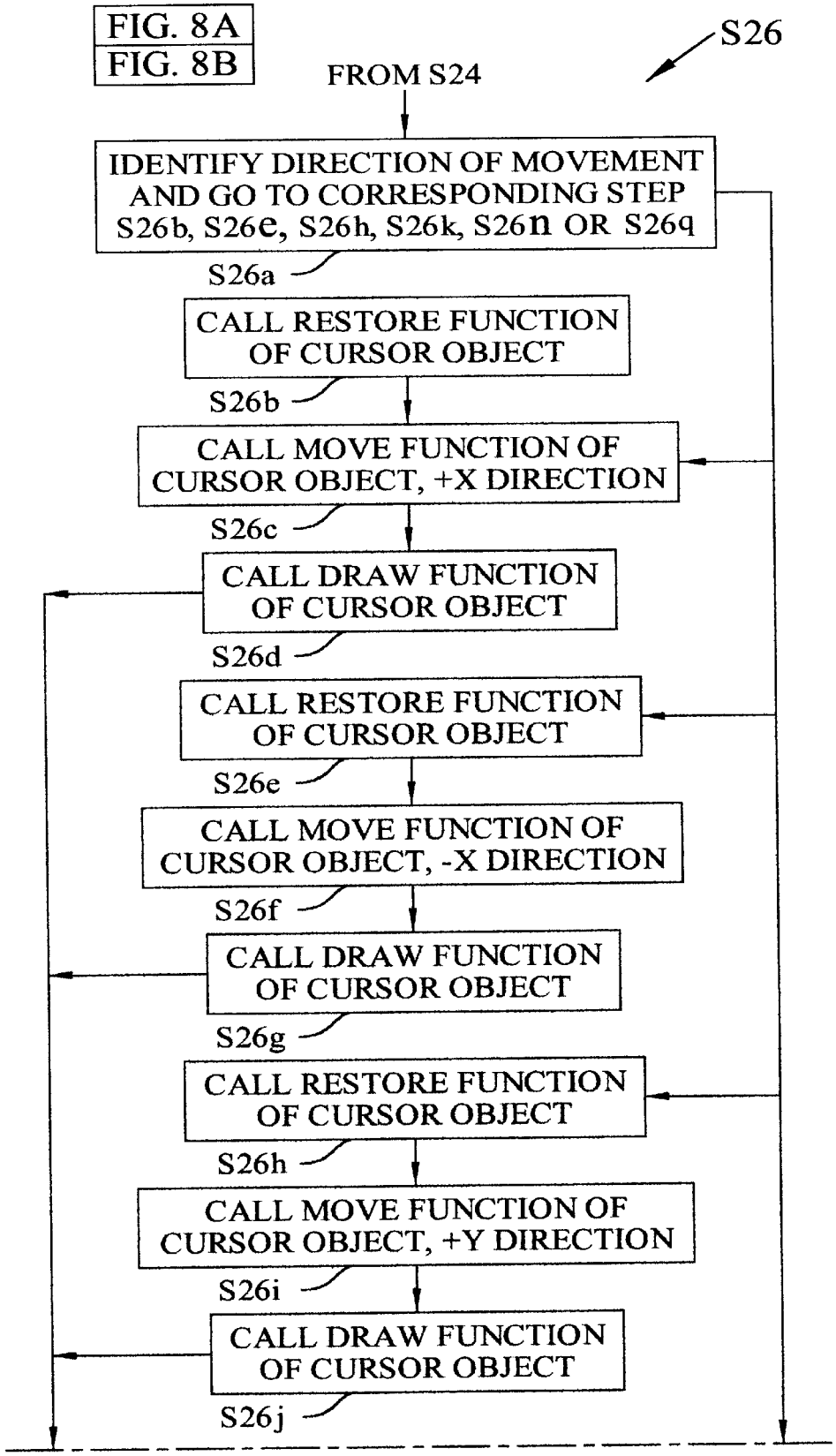

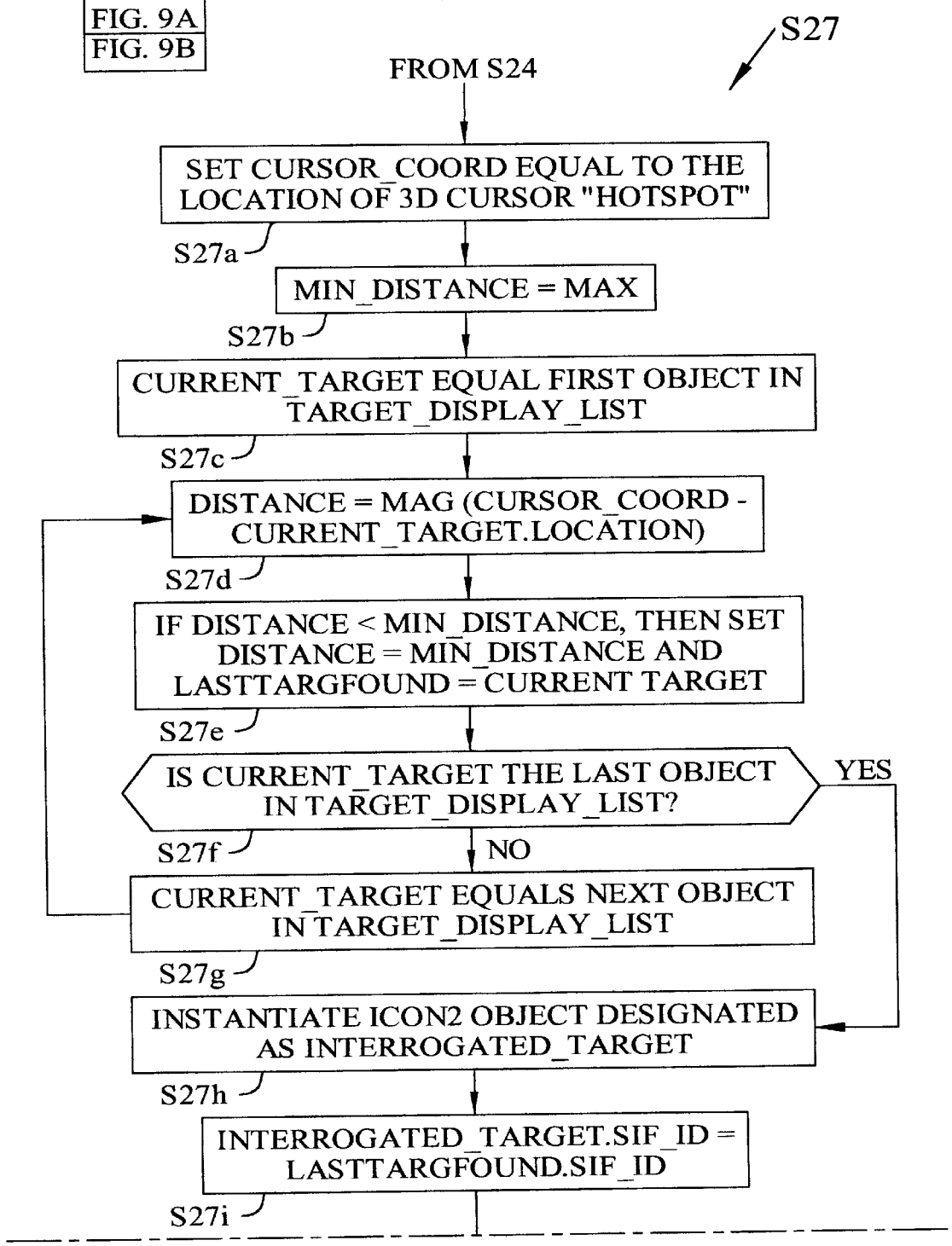

| Z ADDRESS ($m_Z$) | X-DEFLECTION VALUE | Y-DEFLECTION VALUE | INTENSITY VALUE |
|---|---|---|---|
| 0 | $X_0$ | $Y_0$ | $I_0$ |
| 1 | $X_1$ | $Y_1$ | $I_1$ |
| 2 | $X_2$ | $Y_2$ | $I_2$ |
| 3 | $X_3$ | $Y_3$ | $I_3$ |
| 4 | $X_4$ | $Y_4$ | $I_4$ |
| 5 | $X_5$ | $Y_5$ | $I_5$ |
| ... | ... | ... | ... |
| MAX-1 | $X_{MAX-1}$ | $Y_{MAX-1}$ | $I_{MAX-1}$ |
| MAX | $X_{MAX}$ | $Y_{MAX}$ | $I_{MAX}$ |

Rows 0–3 grouped as A, B, C, D ...

FIG. 14

COMPUTER CONTROLLED THREE-DIMENSIONAL VOLUMETRIC DISPLAY

CROSS-REFERENCE TO RELATED APPLICATIONS

This application is a continuation-in-part under 37 CFR 1.53 of patent application titled COMPUTER PROGRAM FOR A THREE-DIMENSIONAL VOLUMETRIC DISPLAY, Ser. No. 08/726,305 filed Oct. 2, 1996 now U.S. Pat. No. 5,945,966, patent application titled THREE DIMENSIONAL SPATIAL PLAN POSITION INDICATOR DISPLAY, Ser. No. 08/431,197 filed Apr. 27, 1995 now abandoned, and patent application titled LASER BASED 3D VOLUMETRIC DISPLAY SYSTEM, Ser. No. 08/687,091 filed May 3, 1995, now U.S. Pat. No. 5,854,613 which is a continuation of patent application LASER BASED 3D VOLUMETRIC DISPLAY SYSTEM, Ser. No. 08/215,798 filed Mar. 16, 1994, abandoned.

LICENSING INFORMATION

The invention described below is assigned to the United States Government and is available for licensing commercially. Technical and licensing inquiries may be directed to Harvey Fendelman, Legal Counsel For Patents, NCCOSC RDTE DIV CODE 0012, 53510 Silvergate Avenue Room 103, San Diego, Calif. 92152-5765; telephone no. (619)553-3818; fax no. (619)553-3821.

BACKGROUND OF THE INVENTION

The present invention relates to methods for generating three-dimensional images. More specifically, but without limitation thereto, the present invention relates to a computer controlled laser coupled to a moving display surface for displaying a three-dimensional image.

3-D display technologies such as holography, stereoscopic displays, and advanced 3-D graphics engines generally render 3-D images on a two-dimensional display by mapping the coordinates of the 3-D images into 2-D perspective. However, these technologies lack the physiological depth cues needed for true 3-D display imaging, such as motion parallax, accommodation, convergence, and binocular disparity. A 3-D image displayed within a display volume provides the physiological depth cues needed for such applications as air traffic control, submarine undersea navigation, and medical imaging.

One method for presenting aircraft traffic information is designated as the Plan Position Indicator (PPI) display. The PPI display presents the range and azimuth of aircraft via a two dimensional display screen such as a computer monitor. The PPI display receives information from an air traffic control system which employs a radio beacon which repetitively scans through 360 degrees of azimuth. Aircraft equipped with transponders provide air traffic information such as altitude and identity code in response to interrogation signals from the radio beacon. Transponder information is selectively displayed when a display cursor designates a particular aircraft or target on the display screen.

A problem with existing PPI display methods is that more than one aircraft with the same azimuth and range but different altitudes will coincide on the display screen, which could cause confusion leading to disastrous consequences.

A continuing need exists for a display that may be used for surveillance, navigation and air traffic control, as well as for other applications, such as sonar imagery, medical imagery, T.V. presentations, arcade amusement devices, video games, computer graphics, and other uses involving spatially related images.

SUMMARY OF THE INVENTION

The computer controlled three-dimensional volumetric display of the present invention is directed to overcoming the problems described above, and may provide further related advantages. No embodiment of the present invention described herein should be construed to preclude other embodiments or advantages that may exist or become obvious to those skilled in the art.

A three dimensional display system of the present invention comprises a display volume selectively partitioned into distinct display regions, a display surface for scattering light beams from the display volume, at least two optical scanners for modulating the light beams and for directing the light beams to the display surface within each distinct display region respectively, and a display controller. The display controller comprises a world coordinate interface for inputting world coordinates, a data processor for transforming the world coordinates into view coordinates and device coordinates, and an optical scanner controller for sensing and controlling the motion of the display surface and for outputting the device coordinates to the optical scanners to generate a three dimensional image within the display volume.

An advantage of the method of the present invention is that complex 3-D images may be displayed and updated quickly to simulate motion.

Another advantage is that a variety of display surfaces and types of periodic motion used in volumetric displays may be readily be accommodated by the present invention, thus providing a standard interface for displaying world coordinates using different types of display surfaces.

Still another advantage is that the present invention is readily scalable to multi-color displays and parallel subsystems for tracking moving images in a changing environment.

The features and advantages summarized above in addition to other aspects of the present invention will become more apparent from the description, presented in conjunction with the following drawings.

BRIEF DESCRIPTION OF THE DRAWINGS

FIG. 14 is a memory map of the control memory circuit of FIG. 2.

Like structures are referred to by like indicia in all figures.

DESCRIPTION OF THE INVENTION

The following description is presented solely for the purpose of disclosing how the present invention may be made and used. The scope of the invention is defined by the claims.

Figure 1:
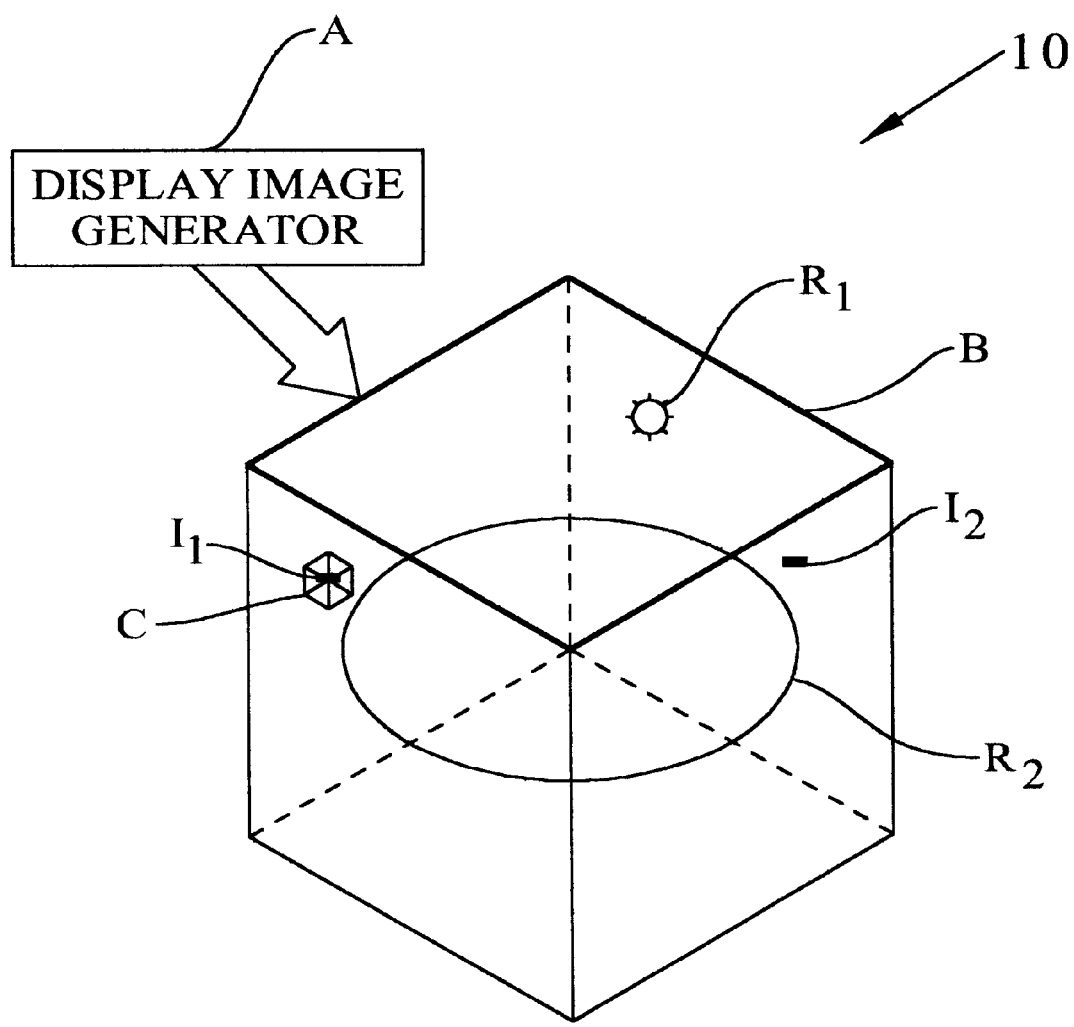
FIG. 1 is an isometric illustration of a three dimensional display system.

FIG. 1 illustrates a 3-D display 10 of an object relative to a reference location within a display volume B. Display image generator A projects images $I_1$ and $I_2$ relative to reference images $R_1$ and $R_2$. Image generator A and display volume B may also generate and display a cursor C which may be used to highlight or select an image or to select a location of interest within display volume B.

A three dimensional image may be composed of one or more voxels which are three dimensional volume elements analogous to pixels in a two dimensional display system. The voxels may be illuminated by pulsed light beams or other types of energy beams, for example, lasers. Combinations of beams from different sources may also be used to generate images in separate, converging, and intersecting beams.

An example of a display surface suitable for mapping out a display volume is a rotating double helix. Other surfaces may also be used, for example, a single rotating helix. Reciprocating surfaces such as a piston may also be used as a display surface to map out a display volume. Although an example of a display surface moving in air is described below, gaseous, liquid, and solid state materials may also may also be used in display volumes to display images with the present invention.

Figure 10:
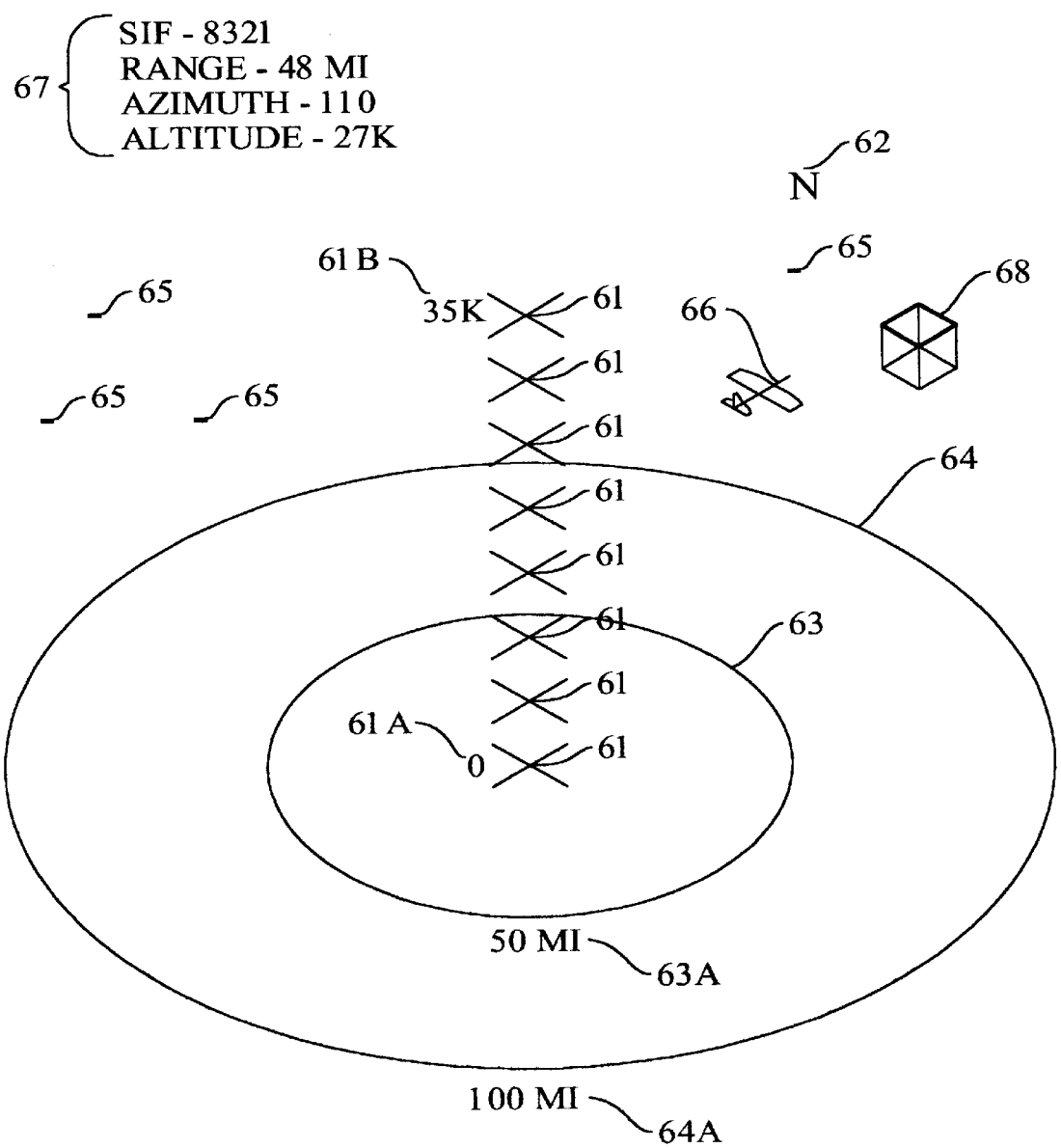
FIG. 10 illustrates exemplary features relating to the appearance of the three dimensional display.

3-D volumetric display 10 may be used to present many forms of data. A specific application is air traffic control (ATC) data. The application of the three-dimensional volumetric display to ATC data display may also be referred to as a Spatial Plan Position Indicator (SPPI) display. The SPPI display processes ATC data to produce target data. Target data may be data representing identity, range, azimuth, and altitude of aircraft. Target data are processed to produce display data representative of one or more target images. In addition to target images, one or more reference images may also be displayed. A reference image may be useful for visualizing spatial relationships among target images. For example, reference images may include range rings, altitude indicators and a north azimuth symbol as illustrated in FIG. 10.

The relative altitude of aircraft may be displayed within a three dimensional display volume by receiving and processing real time ATC information, and by converting the ATC information into a form suitable for 3-D volumetric display 10.

Figure 2:
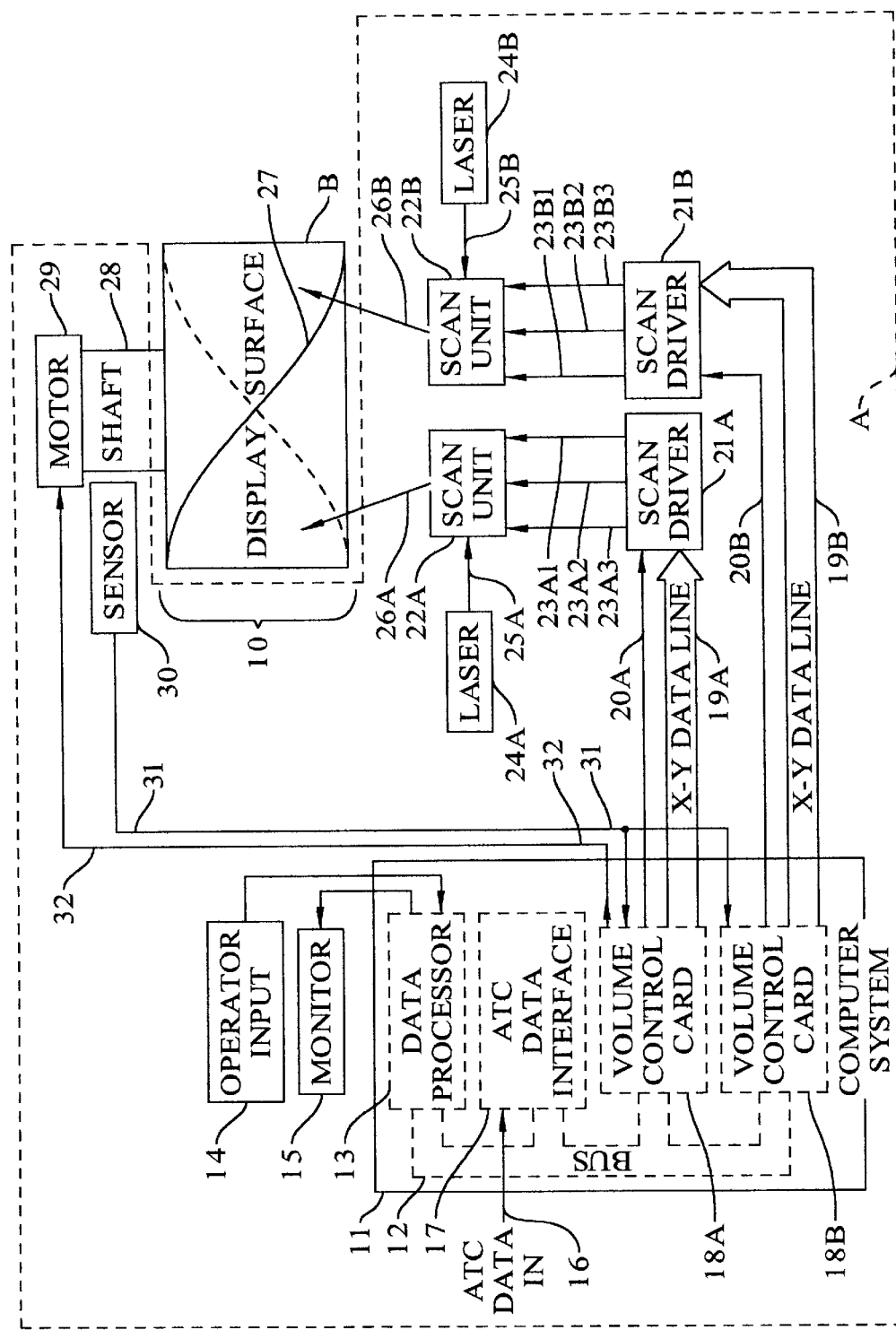
FIG. 2 is a block diagram of a three dimensional display system of the present invention.

FIG. 2 is a block diagram of an exemplary 3-D volumetric display 10 of the present invention. A display controller 11 controls the motion of display surface 27 inside display volume B. Display controller 11 may be, for example, an IBM AT compatible personal computer system including a monitor 15 and a keyboard or other input device 14 such as a mouse, joystick, and other well known components for operator input. Display controller 11 has an address/data bus 12 that interconnects a data processor 13 to an ATC interface 17 and optical scanner controllers 18A and 18B. Data processor 13 includes standard computer system cards and components not separately illustrated, such as a mother board, processing components, memory components, video display components, and other standard components.

A world coordinate system that provides actual image and reference positions, in this example an air traffic control system (not shown), provides ATC (air traffic control) data to data interface 17. An air traffic control system which might be employed in conjunction with the present invention is designated as the AIMS MARK XII IFF System. A detailed description of this system can be found in a System Operator's Manual prepared by the Naval Electronic Systems Test and Evaluation Facility, Saint Inigoes, Md., document NAVELEX 0967-390-8040. This air traffic control system will be referred to hereafter as the IFF system or as the ATC system.

The IFF system transmits a directional radio beacon which revolves repetitively through 360 degrees approximately once every 12 seconds. The IFF system sends interrogation code pulses via a radio beacon. Aircraft (also referred to as targets) having transponders reply with encoded radio signals that convey target classification (military, commercial, etc.), target identity (a number assigned to the target by air traffic controllers when the target enters controlled airspace), and target altitude. Target azimuth is determined by the direction of the radio beacon and target range is obtained from the time delay of the return signal.

Still referring to FIG. 2, ATC data is input as a serial sequence of encoded binary data via a serial data line 16 to ATC data interface card 17. By way of example, serial data line 16 may be a serial MIL-STD-1553B bus and data interface card 17 may be a commercially available model BUS-65515 manufactured by the ILC Data Device Corporation, 105 Wilbur Place, Bohemia, N.Y. 11716. Data interface card 17 stores the ATC data in a serial data memory buffer (not separately illustrated) included on data interface card 17. Although a serial digital interface is used to input the world coordinate data in this example, parallel digital and other well known data interfaces may also be used.

Data processor 13 processes the ATC data from data interface card 17 and provides view coordinate data to optical scanner controllers 18A and 18B via data bus 12.

Optical scanner controllers 18A and 18B process the view coordinate data input from data processor 13 control and provide device coordinate data to optical scanners 21A and 21B, respectively. Although two optical scanner controllers 18 and two optical scanners 21 are shown in this example, additional optical scanner controllers and optical scanners may be readily added to increase image update rate and to provide multiple colors. Using four of each, for example, doubles the image update rate that is available from only two of each.

Figure 13:
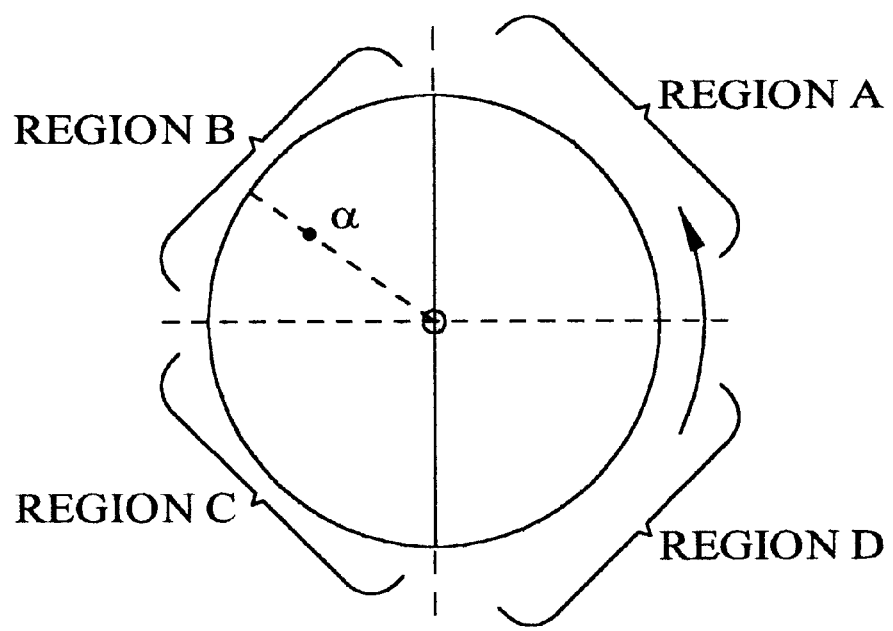
FIG. 13 is a diagram of the geometric relationships of a double helix for calculating the Y-axis position on the double helix as a function of the angle of rotation within a display volume partitioned into four regions.
Figure 13:
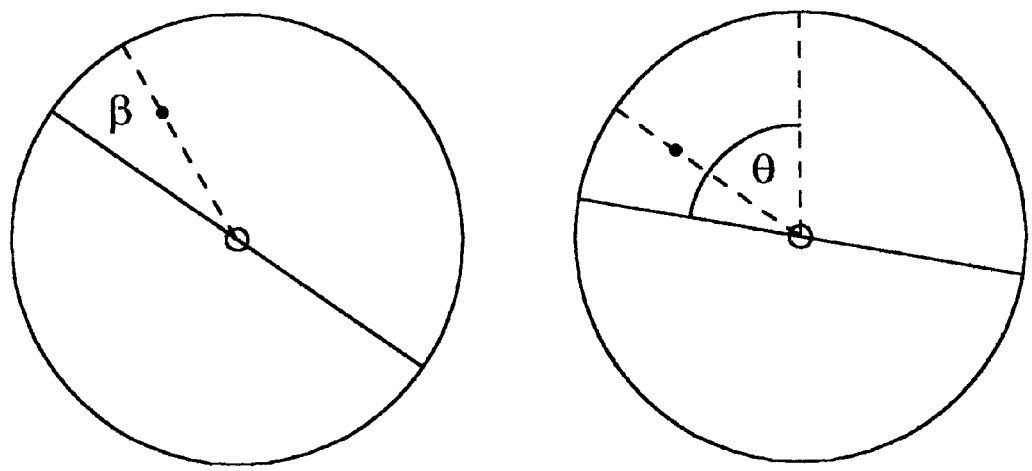
Figure 15:
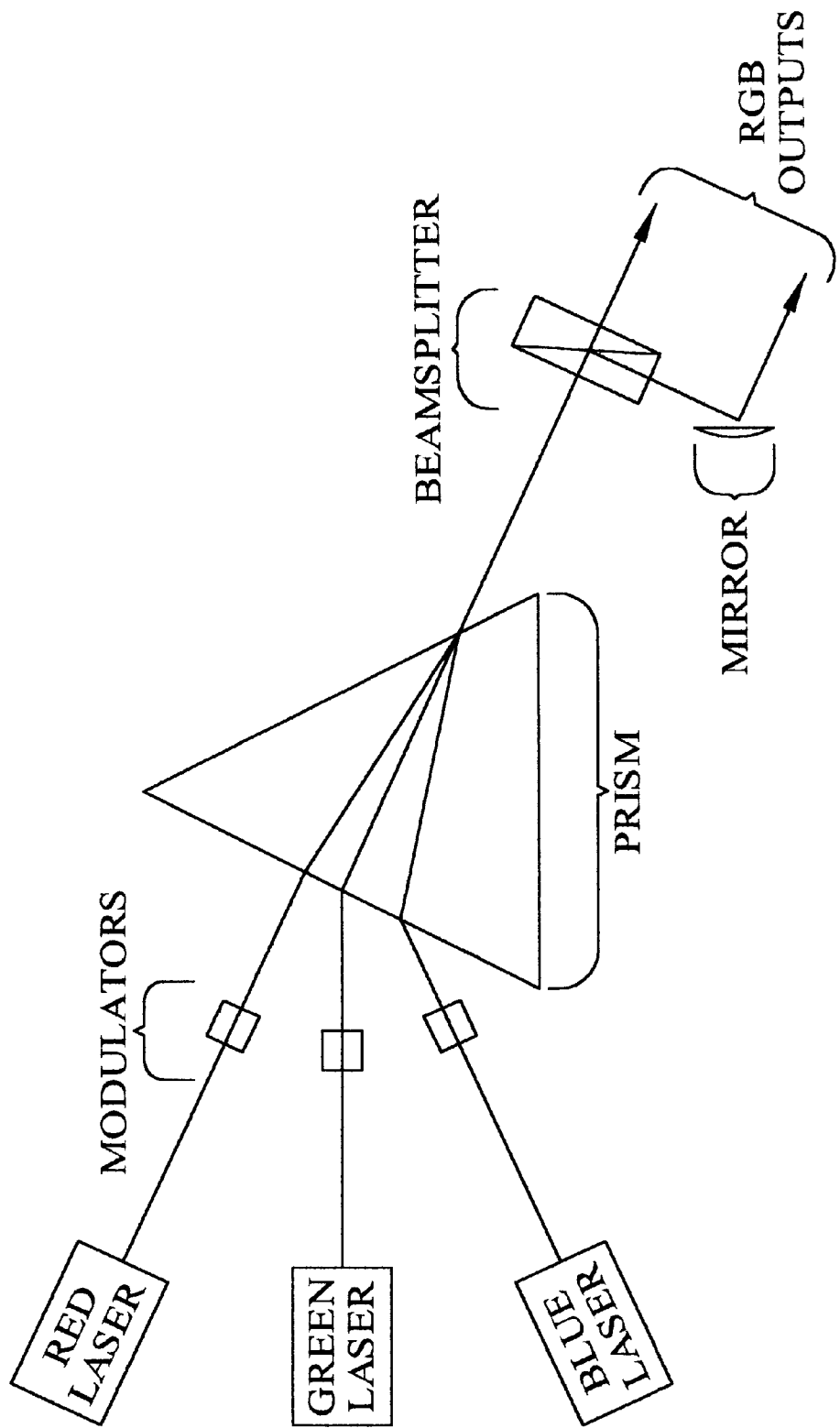
FIG. 15 illustrates an example of an angular combiner for generating two light beams having variable color.

The update rate of the three-dimensional display may be further enhanced by partitioning the display volume into distinct display regions A, B, C, and D associated with each of four optical scanners as shown in FIG. 13. The angular displacement required of each optical scanner is limited to the associated display region, and the number of voxels displayed is limited to the portion of the image that lies within the associated display region. Multiple colors may be provided by using separate optical scanners for each color or by angularly combining red (R), green (G), and blue (B) lasers with an angular combiner such as a prism P as shown in FIG. 15 to display a voxel of a selected color using a single optical scanner. Modulators M may be added to vary the color of the output light beam, and a beamsplitter and mirror may be used to generate an additional output light beam. Optical scanner controllers 18A and 18B convert the data for display into digital and analog control signals which are conveyed via signal lines 19A, 19B, 20A and 20B to optical scanner drivers 21A and 21B.

Optical scanner drivers 21A and 21B convert the digital and analog control signals into control signals suitable for deflecting light beams 25A and 25B from lasers 24A and 24B, respectively. Input light beams 25A and 25B may be of different colors, for example, red and green. Optionally, a single laser and a beamsplitter might be used to generate two light beams. Optical scanner output units 22A and 22B provide output light beams 26A and 26B respectively which are projected into three dimensional display volume B. Display surface 27 scatters the light from output light beams 26A and 26B from various angular positions within display volume B to create a three-dimensional image.

Figure 3:
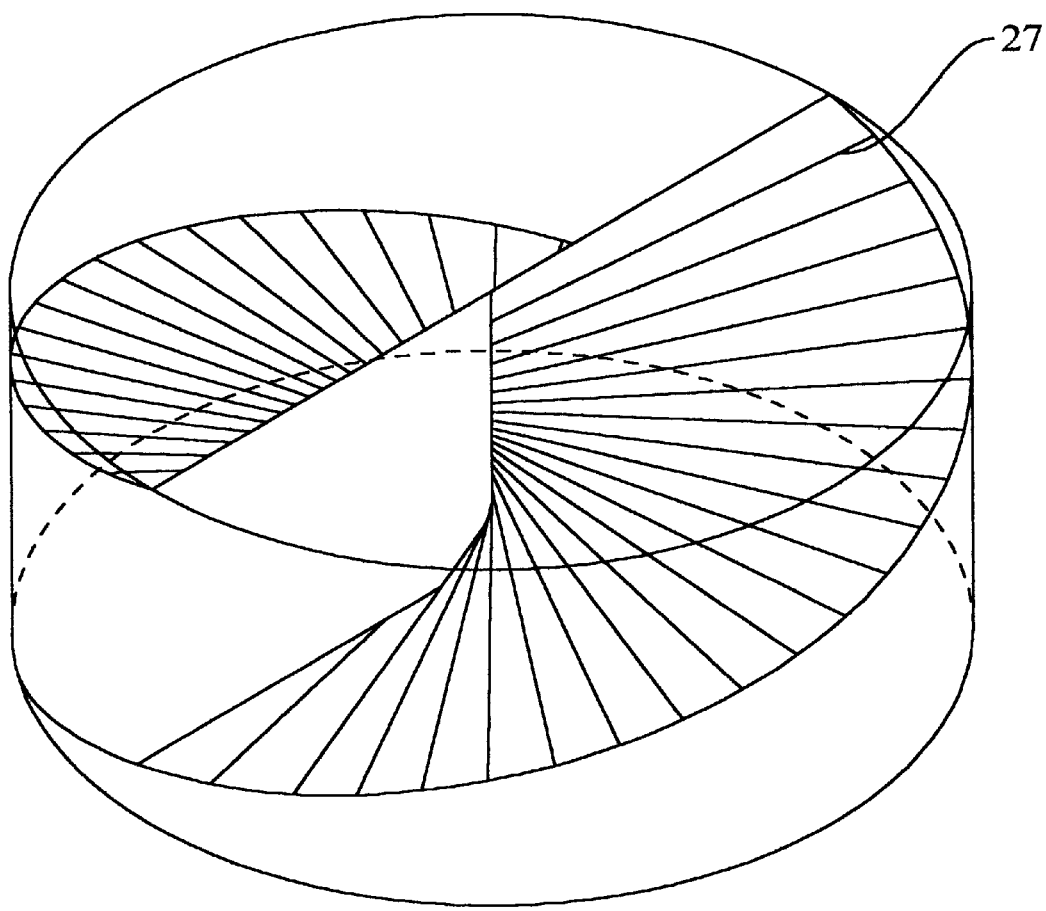
FIG. 3 is an illustration of an exemplary display surface in the form of a double helix.

Display surface 27 may have a double helix configuration as illustrated in FIG. 3. Rotation of the double helix about the center line of the double helices creates cylindrically-shaped three dimensional display volume B. The shape of the display surfaces may be modified to change the shape of the display volume. Periodically displaced or reciprocating display surfaces may also be used to scatter light beams 26A and 26B, as well as gas-filled and solid state display volumes.

The optical scanner controllers include the functions of controlling the programmable timer, reading the shaft counter, setting the motor speed register, specifying I/O addresses, interrupt control, reading display data stored in RAM, and providing display data to the desired RAM locations.

Referring now to FIG. 2, rotation of display surface 27 may be effected by interconnected shaft 28 extending from motor 29. Other rotation imparting schemes might be chosen such as magnetic levitation with an air turbine drive. Due to the symmetry of the double helix, display surface 27 has geometrically equivalent positions when rotated by 180 degrees, reducing the speed requirement of motor 29. Three dimensional display system 10 also includes sensor 30 shown in FIG. 2, which senses 0 degree and 180 degree positions (defined relative to a user selected orientation) of shaft 28 and provides angle index signals via signal line 31 to optical scanner controllers 18A and 18B as shown. Sensor 30 could be any of a number of commercially available optical, magnetic, or other rotation sensing devices. The speed of motor 29 is controlled by a signal conveyed via a signal line 32 from optical scanner controller 18A.

The rotation of display surface 27 in conjunction with scanning and modulation of light beams 26A and 26B on the display surface results in a sequence of illuminated voxels that produces the effect of a continuous three dimensional image.

Figure 4:
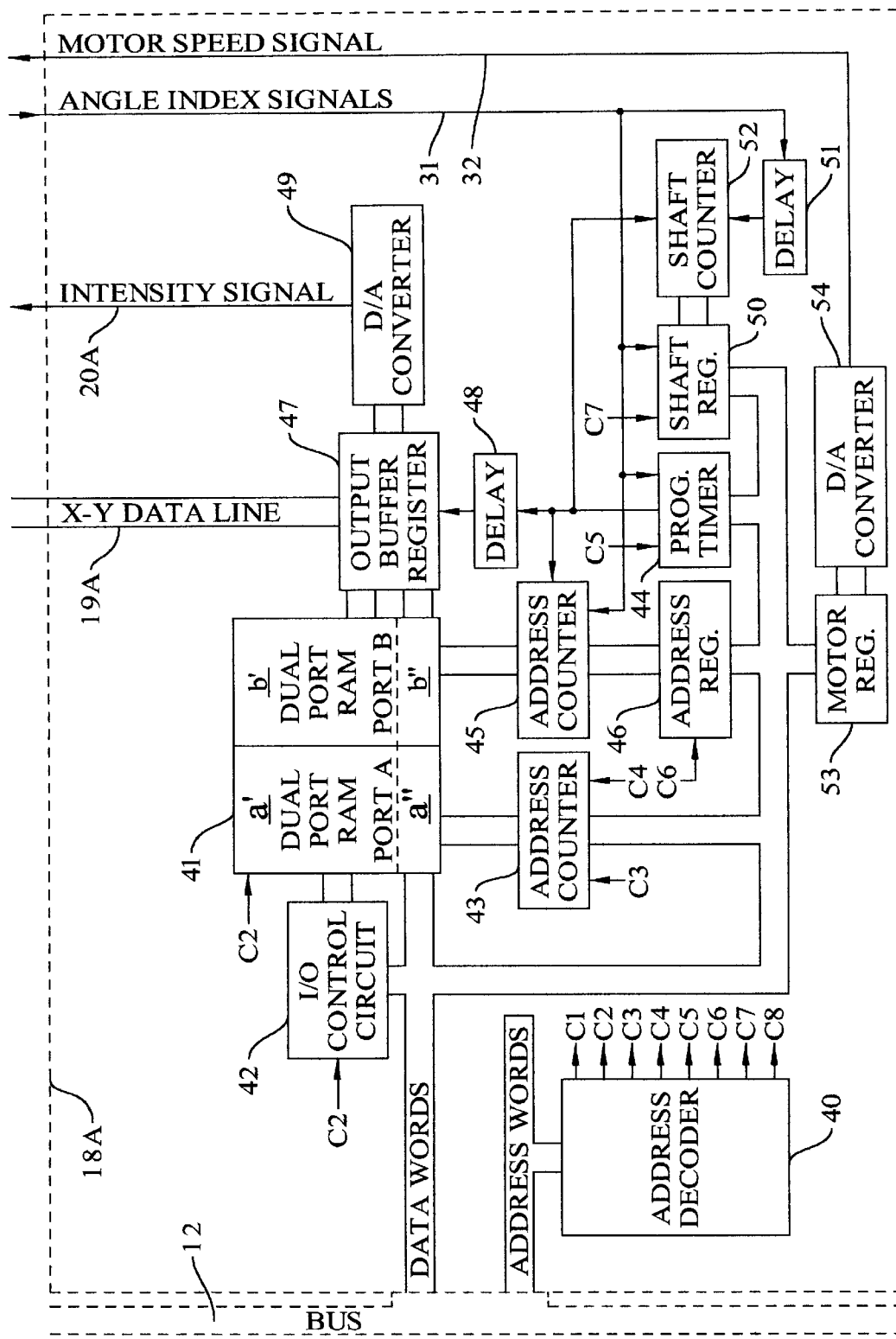
FIG. 4 is a block diagram of an optical scanner controller of the present invention.

FIG. 4 is a block diagram of optical scanner controller 18A, also referred to as optical scanner controller 18A. Optical scanner controller 18B is identical in design to optical scanner controller 18A. Address decoder 40 receives address words from bus 12 and provides read and write control commands to various components via control lines C1, . . . , C8.

A control memory comprising a dual port random access memory (RAM) 41 receives data words from I/O control circuit 42 and from bus 12. RAM 41 includes two independently addressable ports, port A and port B. Read/write commands are received via line C2 from address decoder 40. I/O circuit 42 is used in conjunction with bus 12 to input data words into RAM 41 having a larger width than that of bus 12 alone. For example, if RAM 41 inputs 24 bit words and bus 12 provides data words of 8 bits, then I/O circuit 42 can be designed to input 16 bit words. Data latching commands to I/O circuit 42 are conveyed via command line C1. 8-bit words from 8-bit lower memory a" of port A are input by direct connection with bus 12. An alternative approach would be to use a computer system having a data bus at least as wide as the desired RAM data width. The address input of port A is controlled by address counter 43. Counter 43 reads an initial address from bus 12 when commanded via line C3 and an address increment command via line C4.

Programmable timer 44 provides a selected number of clock pulses at a selected rate in accordance with data words received from bus 12 when command line C5 is activated. The clock pulse sequence is initiated by an angle index signal from display surface 27 received via line 31.

The address input of port B is controlled by address counter 45. Counter 45 reads an initial address from address register 46 when an angle index signal is received via line 31, and increments the address when a clock pulse is received from programmable timer 44. Address register 46 reads an initial address from bus 12 when command line C6 is activated.

Output buffer register 47 receives 16 bit words from upper memory b' of port B of RAM 41 and 8 bit words from lower memory b" of RAM 41. Memory address counter 45 increments the address of port B when a clock pulse is received from programmable timer 44. After a delay (typically about 100 ns) provided by delay circuit 48, the clock pulse from programmable timer 44 causes the data word at port B to be read by output buffer register 47. Data words which represent X-Y deflection data are conveyed from output buffer register 47 to an optical scanner driver via X-Y data line 19A. The data word representing voxel intensity is converted into an analog signal voltage by D/A converter 49. The output of D/A converter 49 is conveyed to an optical scanner via signal line 20A.

Circuits included on optical scanner controller 18A also convey information to the computer system regarding the period required for display surface 27 to rotate by 180 degrees. Angle index signals at 0 degrees and 180 degrees are received via line 31. Angle index signals cause shaft register 50 to be set to a count contained in shaft counter 52. After a delay (typically about 100 ns), shaft counter 52 is reset to zero. Shaft counter 52 is then incremented by pulses from programmable timer 44 until the next angle index signal is received. The number of clock pulses which occurred during the previous 180 degrees of rotation of display surface 27 is presented to bus 12 by shaft register 50 whenever a read command is activated by line C7.

The motor speed is set by data words coupled from bus 12. Motor register 53 reads a data word from bus 12 when a control signal is received via line C8. The data word is converted into an analog signal voltage by D/A converter 54. The analog signal voltage is conveyed to voltage controlled motor 29 (shown in FIG. 2) via line 32.

The design and operation of optical scanner controller 18B and any additional optical scanner controllers is substantially the same as described above, except that the motor shaft speed outputs are not used.

Figure 5:
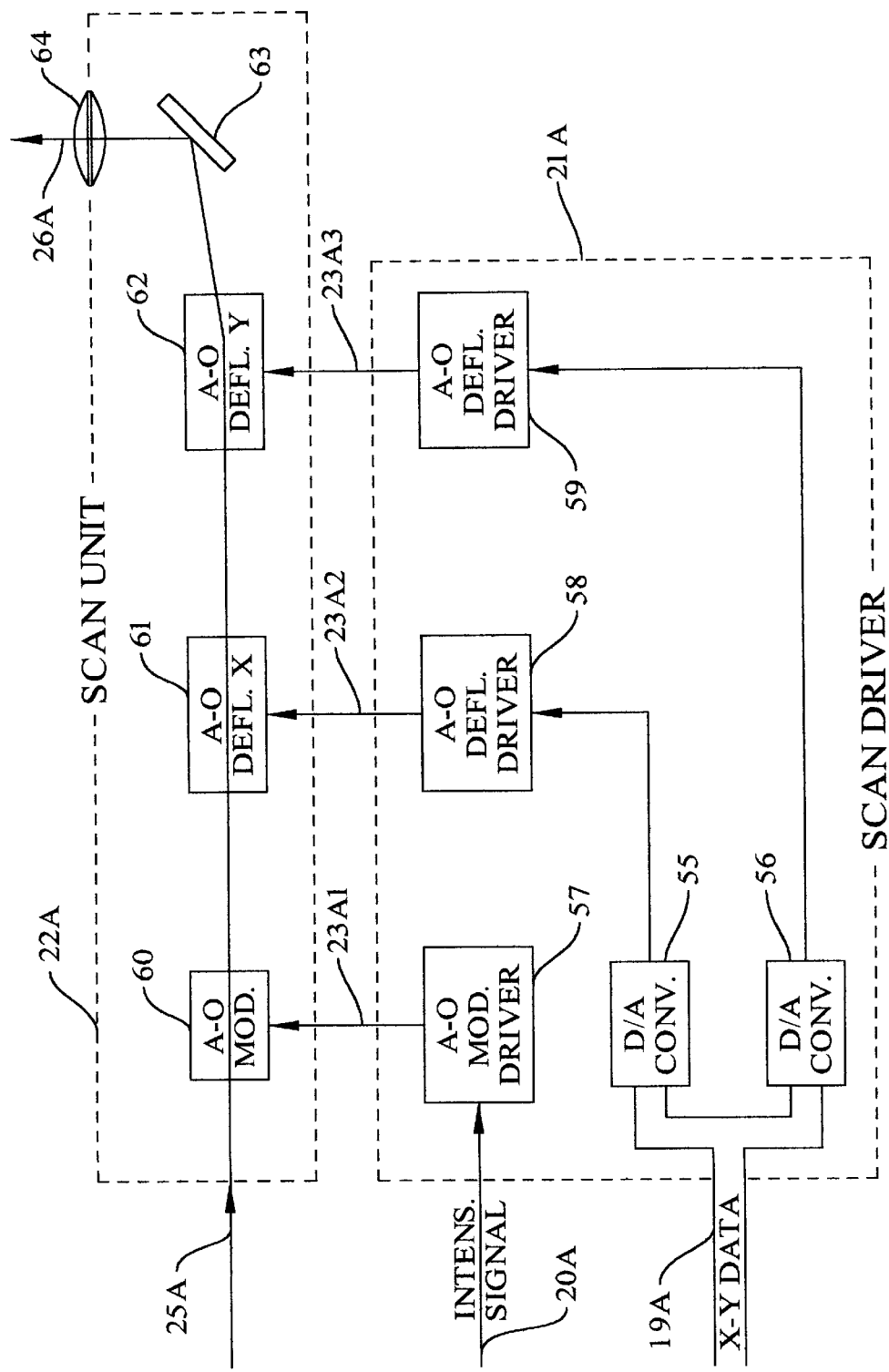
FIG. 5 is a block diagram of an exemplary optical scanner.

FIG. 5 is a block diagram of a typical optical scanner beam deflector 22A and optical scanner driver 21A that may be used to deflect a light beam 25A. Light beam 25A may be provided, for example, by a laser. Digital data representing X-deflection and Y-deflection are conveyed to scan driver 21A via parallel signal line 19A. The X-deflection data from an optical scanner controller are conveyed to D/A converter 55 and the Y-deflection data are conveyed to D/A converter 56 respectively and converted into analog voltage signals. The X-deflection analog voltage signal is provided to acousto-optic (A-O) deflector driver 58 which produces an RF signal for driving an A-O deflector 61. The Y-deflection analog voltage signal is provided to acousto-optic (A-O) deflector driver 59 for driving an A-O deflector 62. An analog voltage intensity signal is from an optical scanner controller is input via signal line 20A and provided to A-O modulator driver 57 for controlling the intensity of light beam 25A.

The RF signal from A-O modulator driver 57 is conveyed via line 23A1 to scan unit 22A and provided to A-O modulator 60. The RF signal from A-O deflector driver 58 is conveyed via line 23A2 to scan unit 22A and provided to A-O deflector 61. The RF signal from A-O deflector driver 59 is conveyed via line 23A3 to scan unit 22A and provided to A-O deflector 62. Input light beam 25A is modulated by A-O modulator 60, given an X-direction deflection by A-O modulator 61, and given a Y-direction deflection by A-O modulator 62. Mirror 63 redirects the light beam through projection lens 64 to provide output light beam 26A which is projected onto rotating display surface 27 of three dimensional display volume B as described above.

The design and operation of optical scanner deflector 22B and optical scanner driver 21B shown in FIG. 2 are substantially identical to optical scanner deflector 22A and optical scanner driver 21A, respectively, except that light beams 25B and 26B may be of a different color from light beams 25A and 26A, as noted above to display three dimensional images of different colors within the same display volume.

A three dimensional image may be displayed as a series of image frames. A frame period coincides with the interval in which display surface 27 rotates by 180 degrees from either the position coincident with the 0 degree angle index signal or the position coincident with the 180 degree angle index signal. The frame period is divided into time slices by clock pulses produced by programmable timer 44 (refer to FIG. 4). The number of time slices per frame period is selected by adjusting the motor speed and the clock rate. A typical choice might be 4000 time slices per a frame period of 1/20 second.

Each time slice corresponds to an address selected for port B of RAM 41 by address counter 45. The addresses are incremented relative to an initial address stored in address register 46 by clock pulses from programmable timer 44. At the beginning of each frame period a sequence of display data words stored in RAM 41 is sent from optical scanner controller 18A via X-Y data lines 19A. A corresponding sequence of analog intensity signals is sent via signal line 20A. Each data word and corresponding analog intensity signal represent a voxel which is displayed on the display surface during the corresponding time slice.

When an image frame of display data has been stored in the random access memories of the optical scanner controllers, the image frame will be repeatedly displayed in each subsequent frame period. Modifying data words at selected addresses causes the image frame to be selectively modified.

In FIG. 3 display surface 27 of three dimensional display volume B is shaped as two 180 degree helices. The axis of the helices is designated the Y-direction. All X, Y, Z coordinates in the display volume are intersected by the rotating display surface during each frame period. Every voxel location in the display volume has a corresponding X and Z deflection of the laser beam and a time slice in which the display surface intersects the Y coordinate. As noted before, each time slice corresponds to an address in an optical scanner controller random access memory.

Figure 11:
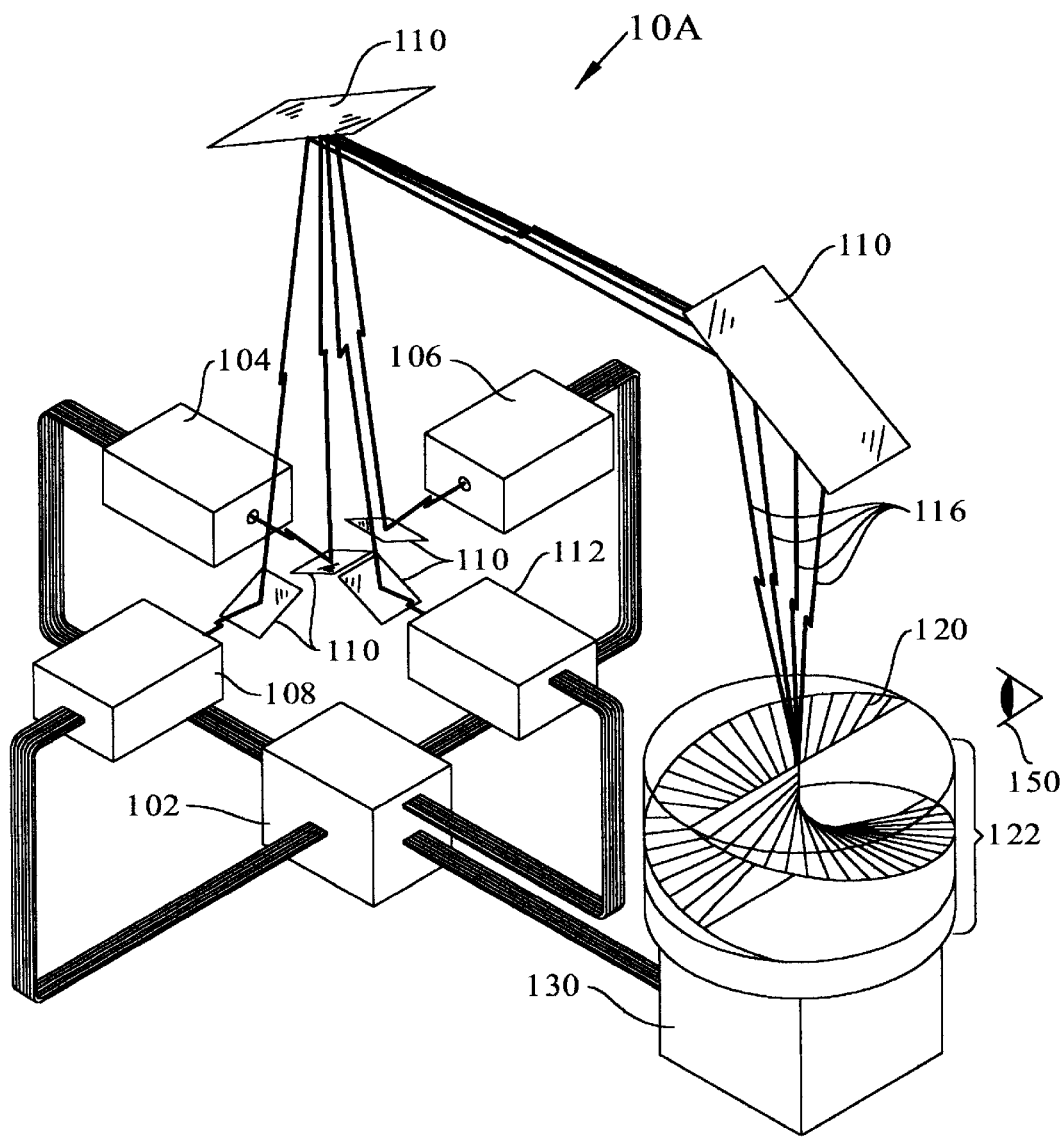
FIG. 11 is a diagram of a 3-D volumetric display with a rotating double helix display surface.
Figure 12:
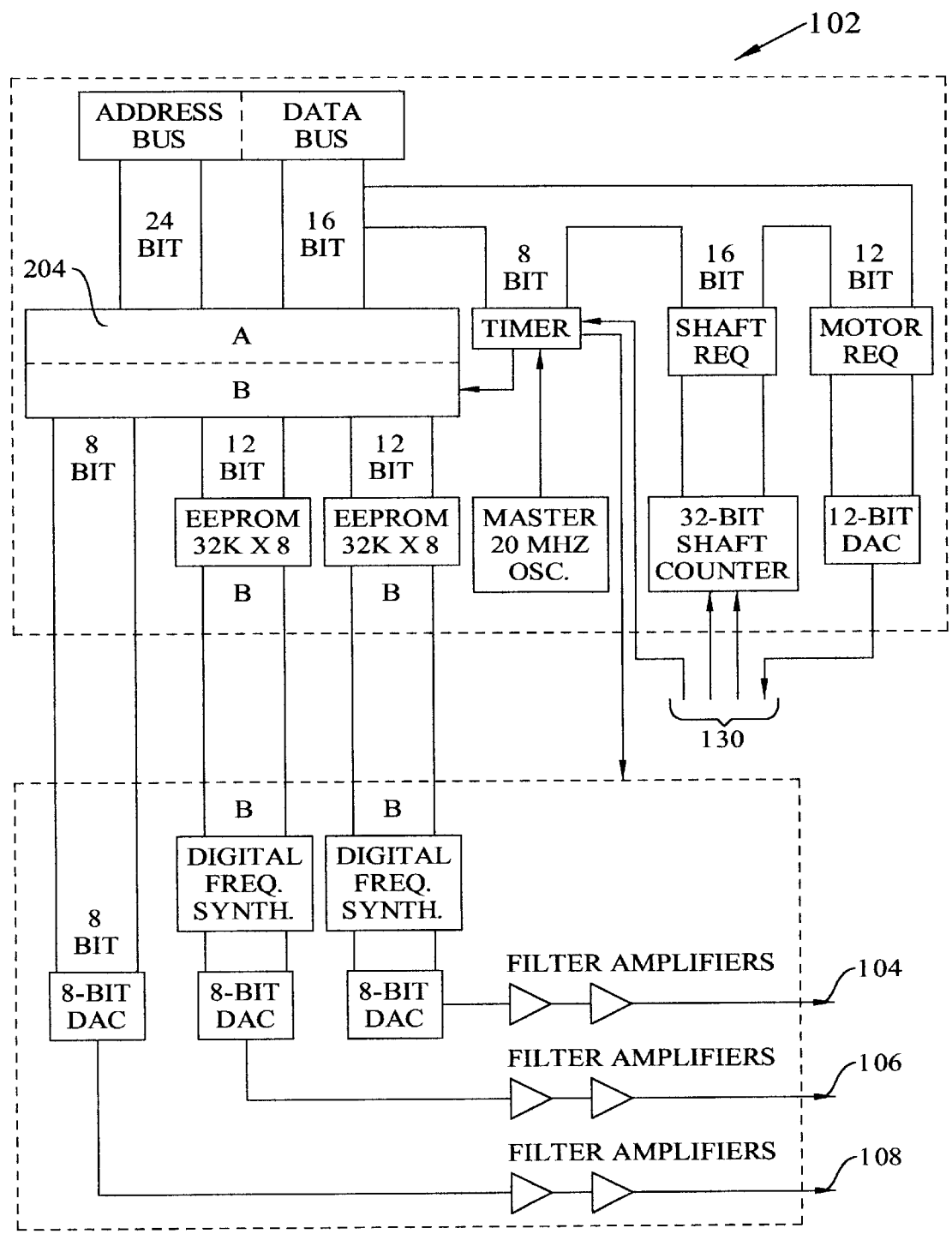
FIG. 12(a–b) is a diagram of a beam deflector drive circuit for the 3-D volumetric display of FIG. 1.

In FIG. 11, an exemplary 3-D volumetric display 10A comprises beam deflector control circuit 102, beam deflectors 104, 106, 108, and 112, mirrors 110, a display surface 120, and a drive motor 130. In this example, display surface 120 is implemented as a double helix, although other surface geometries may also be used, such as a single helix, a tilted ellipse, a multiple helix, and a piston, etc. Drive motor 130 imparts a periodic motion to display surface 120 within a display volume 122. Beam deflector control circuit 102 inputs world coordinates of a scene and causes beam deflectors 104, 106, and 108 to direct light beams 116 onto display surface 120 from mirrors 110. Light beams 116 illuminate view coordinates on display surface 120 to generate an image representative of the scene corresponding to the input world coordinates. The motion of display surface 120 scatters light from light beams 116 from different positions within display volume 122, time-multiplexing the illuminated view coordinates to generate a complete three-dimensional image to the eye of an observer 150.

FIG. 2 is a diagram of beam deflector control circuit 102 in FIG. 1. A dual port RAM 204 is used to load device coordinates corresponding to the view coordinates into one portion of memory while outputting the previously loaded device coordinates from another portion of memory to beam deflectors 104, 106, and 108.

Optical Scanner Control Functions

FIG. 3 shows the geometry of display surface 120 in FIG. 1 to illustrate a calculation of the Y-axis position as a function of the angle of rotation. For a given (x,z) view coordinate, a voxel (illuminated view coordinate) may be placed at a height ranging from 0 to h, where h is the height of display surface 120. The height of the voxel corresponds to a location in dual port RAM 204. To find this location, the amount of angular rotation of display surface 120 from a reference angle of 0 may be expressed by the formula:

$$\alpha = \tan^{-1}\left(\frac{z}{x}\right)$$

The additional amount of rotation required for display surface 120 to reach the desired height y may be expressed as:

$$\beta = \pi\left(\frac{y}{h}\right)$$

The total angle of rotation θ is the sum:

$$\theta = \tan^{-1}\left(\frac{z}{x}\right) + \pi\left(\frac{y}{h}\right)$$

If the maximum number of voxels displayed per image refresh is mapped as a memory address MAX in dual port RAM 204, the desired memory address m may be expressed by:

$$m = \left\{\frac{\theta}{\pi}\right\} \cdot \text{MAX} = \left[\frac{1}{\pi}\tan^{-1}\left\{\frac{z}{x}\right\} + \left\{\frac{y}{h}\right\}\right] \cdot \text{MAX}$$

FIG. 4 is a table illustrating how dual port RAM may be mapped into device coordinates. The contents of each Y-axis address ranging from 0 to MAX is divided into device coordinates comprising a x-deflection value, a z-deflection value, and an intensity value.

World coordinates may be input to beam deflector control circuit 102 and scaled into viewing coordinates appropriate to display volume 122 by, for example, a computer I/O interface according to well known techniques.

Device coordinates $X_D$, $Y_D$, and $Z_D$ may be calculated from the geometry of display volume 122 and beam deflectors 104, 106 and 108 by scaling the world coordinates to the view coordinates of display volume 122. The view coordinates may then be normalized to display volume 122 and transformed into device coordinates to control each beam deflector 104, 106, and 108. By way of example, device coordinates for $X_D$, $Y_D$, and $Z_D$ for volumetric display 10 may be calculated from the following:

$$X=((X-X0)/(H0+Y)*H0+X0$$

$$Z=((Z-Z0)/(H0+Y)*H0+Z0$$

$$AP1=(X-X1)*((A4-A1)/(X4-X1))+A1$$

$$AP2=(X-X2)*((A3-A2)/(X3-X2))+A2$$

$$X_D=(Z-Z1)*((AP2-AP1)/(Z2-Z1))+AP1$$

$$BP1=(Z-Z1)*((B4-B1)/(Z4-Z1))+B1$$

$$BP2=(Z-Z2)*((B3-B2)/(Z3-Z2))+B2$$

$$Z_D=(X-X1)*((BP2-BP1)/(X2-X1))+BP1$$

where (X0, Z0) are the view coordinates corresponding to a perpendicular line through the display volume to a beam deflector.

H0 is the distance between a beam deflector and an upper boundary of the display volume.

(A1, B1) are device coordinates corresponding to a location at the upper right of the display volume.

(X1, Z1) are view coordinates corresponding to a location at the upper right of the display volume.

(A2, B2) are device coordinates corresponding to a location at the upper left of the display volume.

(X2, Z2) are view coordinates corresponding to a location at the upper left of the display volume.

(A3, B3) are device coordinates corresponding to a location at the bottom left of the display volume.

(X3, Z3) are view coordinates corresponding to a location at the bottom left of the display volume.

(A4, B4) are device coordinates corresponding to a location at the bottom right of the display volume.

(X4, Z4) are view coordinates corresponding to a location at the bottom right of the display volume.

The values calculated for the device coordinates may then be loaded into the control memory locations corresponding to the Y-axis position for each of the view coordinates.

Figure 16:
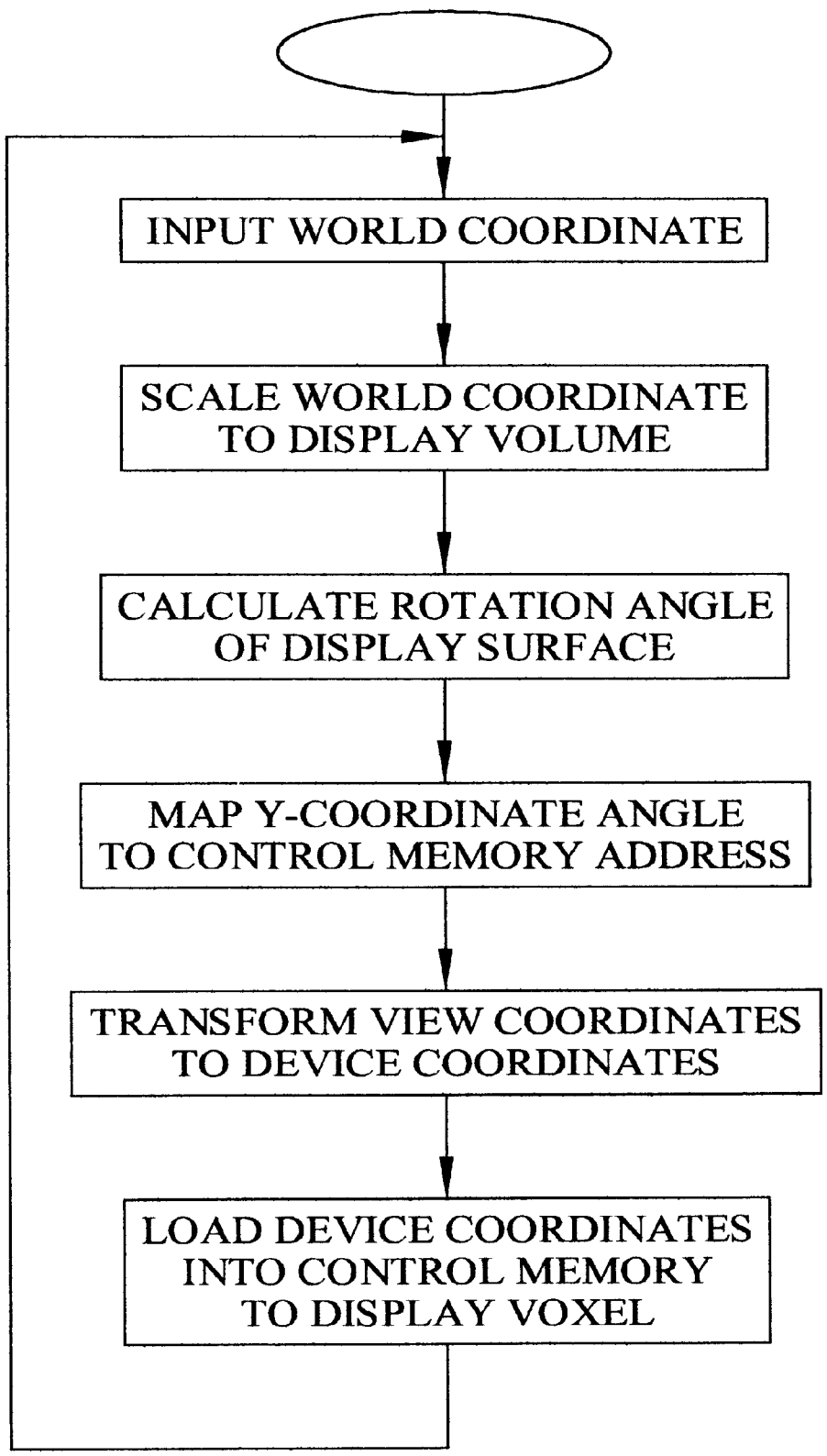
FIG. 16 is a flow chart of an exemplary computer program of the present invention for controlling optical scanners in a display volume.

The method described above may readily be implemented as a computer program according to the flow chart of FIG. 16.

Alternatively, display volume 122 may be partitioned into four regions to double the display rate as follows. A point P defined in the world coordinate system is transformed into a view coordinate P' as described above. If desired, additional transformations such as rotations, translations, etc. may be applied. P' may also be limited to the boundary of the device coordinate system if it falls outside display volume 122. The rotation angle of the leading edge of display surface 120 required to intersect P' is calculated as described above. A display quadrant value q denotes which of the four regions P' is to be displayed. For example, if q=0, P' is in quadrant A, if q=1, P' is in quadrant B, if q=2, P' is in quadrant C, and if q=3, P' is in quadrant D. A incremental angle of rotation is calculated as described above to select the height of display surface 120 required to intersect P'. The total angle of rotation is mapped to the corresponding control memory address. P' is transformed from a view coordinate to a device coordinate P'' as described above using the value of q assigned to the optical scanner for rendering a voxel in the corresponding quadrant. P'' is then loaded into the corresponding control memory location to display the voxel corresponding to P'.

Figure 17:
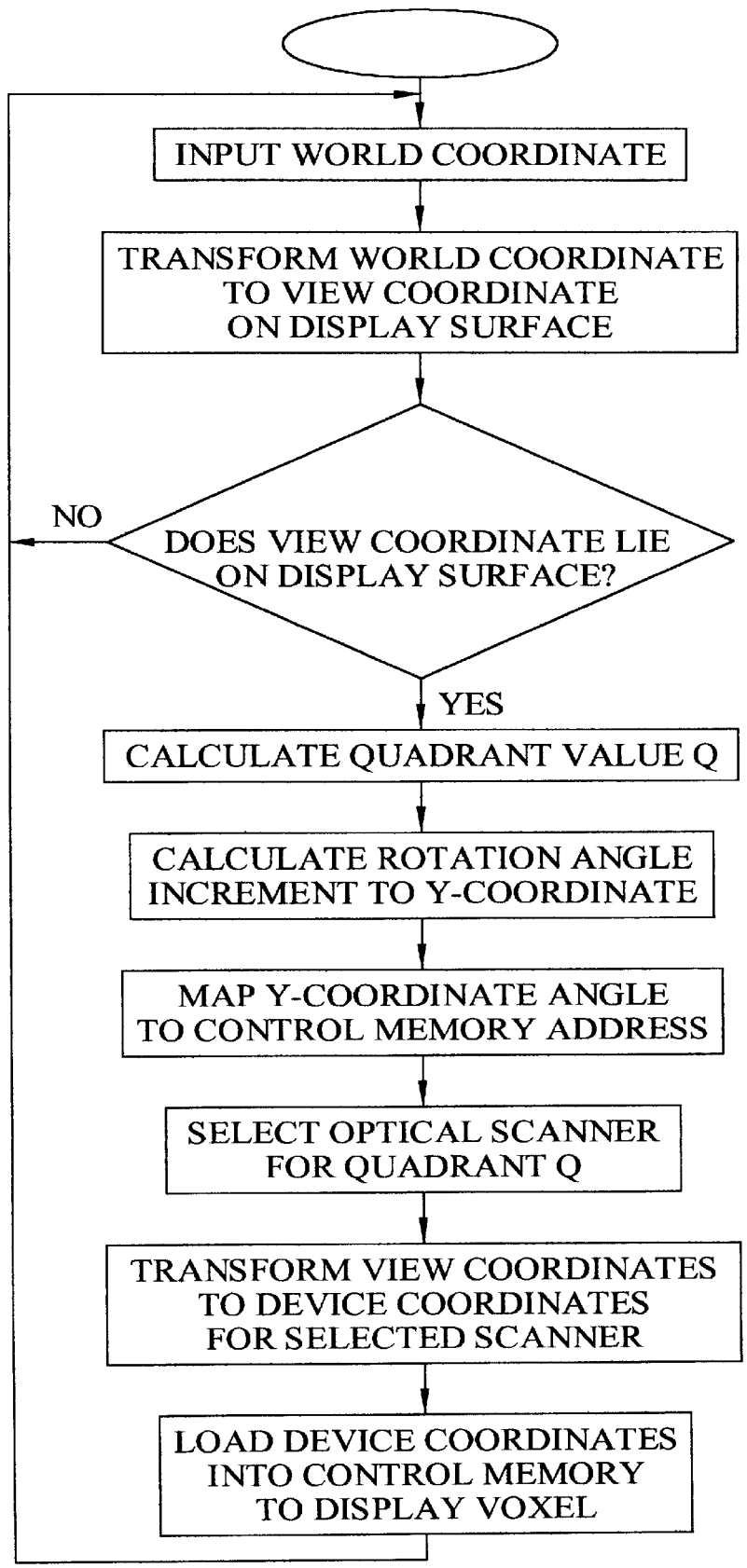
FIG. 17 is a flow chart of an exemplary computer program of the present invention for controlling optical scanners in a display volume partitioned into four regions.

A flowchart for implementing four-quadrant voxel rendering in a computer program is shown in FIG. 17. In step 1702 a world coordinate P representing a point in 3-D space is input having x, y, and z components denoted as P·x, P·y, and P·z. A transformation matrix R may be applied to P to obtain the desired rotation, translation, etc. and denoted as view coordinate P'=R(P). If P' lies outside display volume 122, P' is ignored and the next world coordinate is input. Otherwise a rotation angle θ to bring the leading edge of display surface 122 to P' and the corresponding quadrant value q are calculated as:

$$\theta = \text{atan}(P'\cdot x, -P'\cdot z)$$

$$if(\theta < 0) \text{ then } \theta = \theta + 2\pi$$

$$if(\theta > 3\pi/2) \text{ then } q=0$$

$$\text{else } if(\theta > \pi) \text{ then } q=1$$

$$\text{else } if(\theta > \pi/2) \text{ then } q=2$$

$$\text{else } q=3$$

An incremental rotation angle to position the display surface to the height P'·y required for P' is calculated as:

$$\theta = \theta + (P'\cdot y/(2\pi/MaxY))$$

where MaxY is the maximum view coordinate height of display surface 122. An offset i to the corresponding address pointer MEM in control memory is calculated as:

$$i = MaxVoxels*(\theta/\pi)+q$$

where MaxVoxels is the number of voxels defined for display surface 122 and MEM[i] has x, z, and intensity components MEM[i]·x, MEM[i]·z, MEM[i]·i.

P'·x and P'·z are transformed to device coordinates P'''·x and P'''·z respectively from quadrant value q by:

if(q=0) then $$P'''\cdot x=(P'\cdot x-X1\_chA)*((B4\_chA-B1\_chA)/(X4\_chA-X1\_chA))+B1\_chA$$

$$P'''\cdot z=(P'\cdot z-Z3\_chA)*((A4\_chA-A3\_chA)/(Z4\_chA-Z3\_chA))+A3\_chA$$

if(q=1) then $$P'''\cdot x=(P'\cdot x-X1\_chB)*((B4\_chB-B1\_chB)/(X4\_chB-X1\_chB))+B1\_chB$$

$$P''\cdot z=(P'\cdot z-Z3\_chB)*((A4\_chB-A3\_chB)/(Z4\_chB-Z3\_chB))+A3\_chB$$

else if(q=2) then $$P''\cdot x=(P'\cdot x-X1\_chC)*((B4\_chC-B1\_chB)/(X4\_chC-X1\_chC))+B1\_chC$$

$$P''\cdot z=(P'\cdot z-Z3\_chC)*((A4\_chC-A3\_chB)/(Z4\_chC-Z3\_chC))+A3\_chC$$

else $$P''\cdot x=(P'\cdot x-X1\_chD)*((B4\_chB-B1\_chD)/(X4\_chD-X1\_chD))+B1\_chD$$

$$P''\cdot z=(P'\cdot z-Z3\_chD)*((A4\_chB-A3\_chD)/(Z4\_chD-Z3\_chD))+A3\_chD$$

where B1, B4, A3, A4 are device coordinate limits and X1, X4, Z3 and Z4 are view coordinate limits for each of optical scanners (ch) A, B, C, and D, respectively. P''·x and P''·z are then loaded into control memory locations MEM[i]·x and MEM[i]·z respectively to display voxel P'.

SPPI Programming

A three dimensional spatial plan position indicator (SPPI) display may be implemented by a computer program performing the steps illustrated in FIGS. 6 through 9.

Figure 6B:
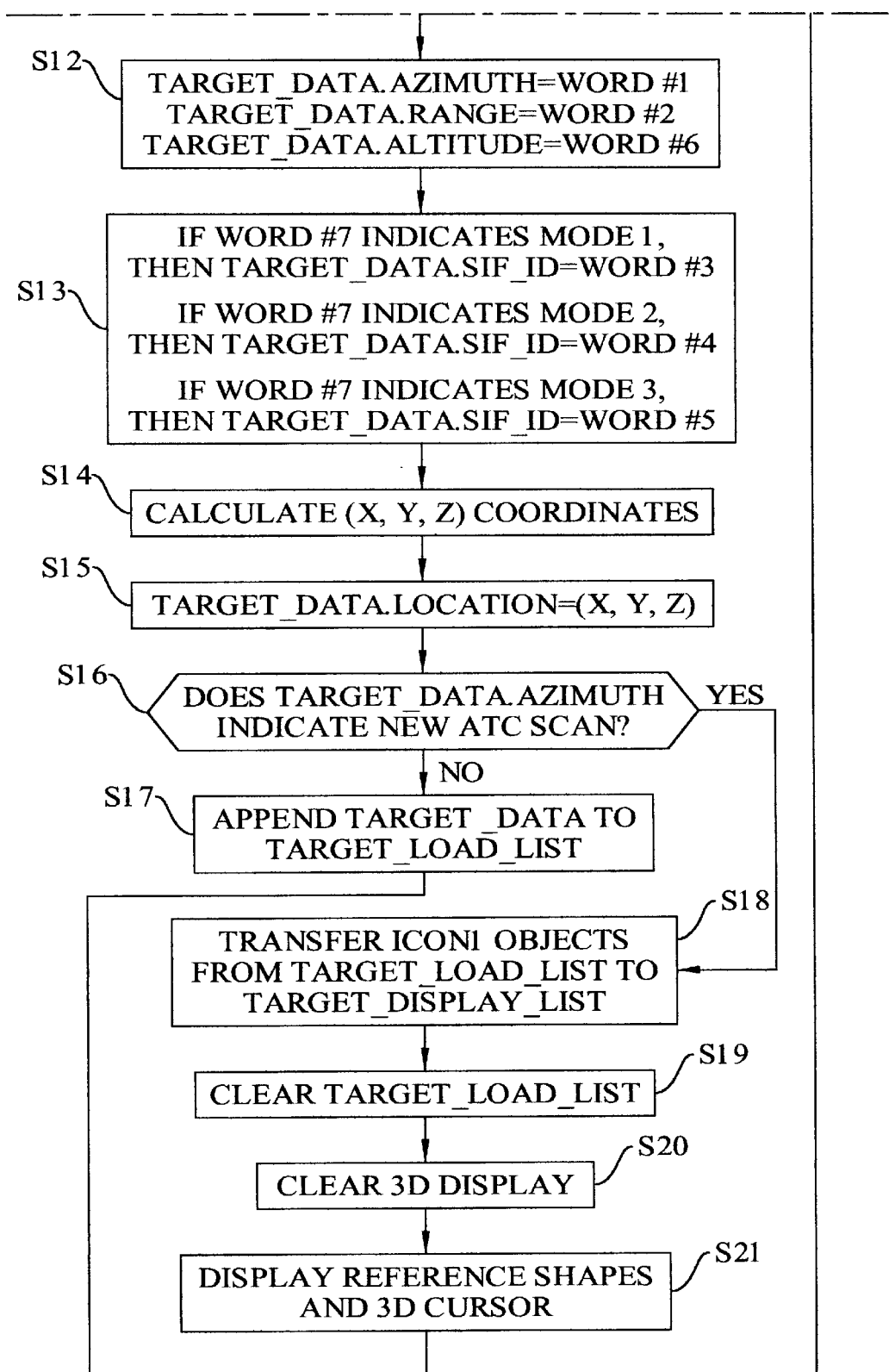
FIGS. 6(a–c), 7(a–b), 8, and 9(a–b) are flow chart diagrams of an exemplary computer program of the present invention for inputting world coordinates and displaying target information.
Figure 6C:
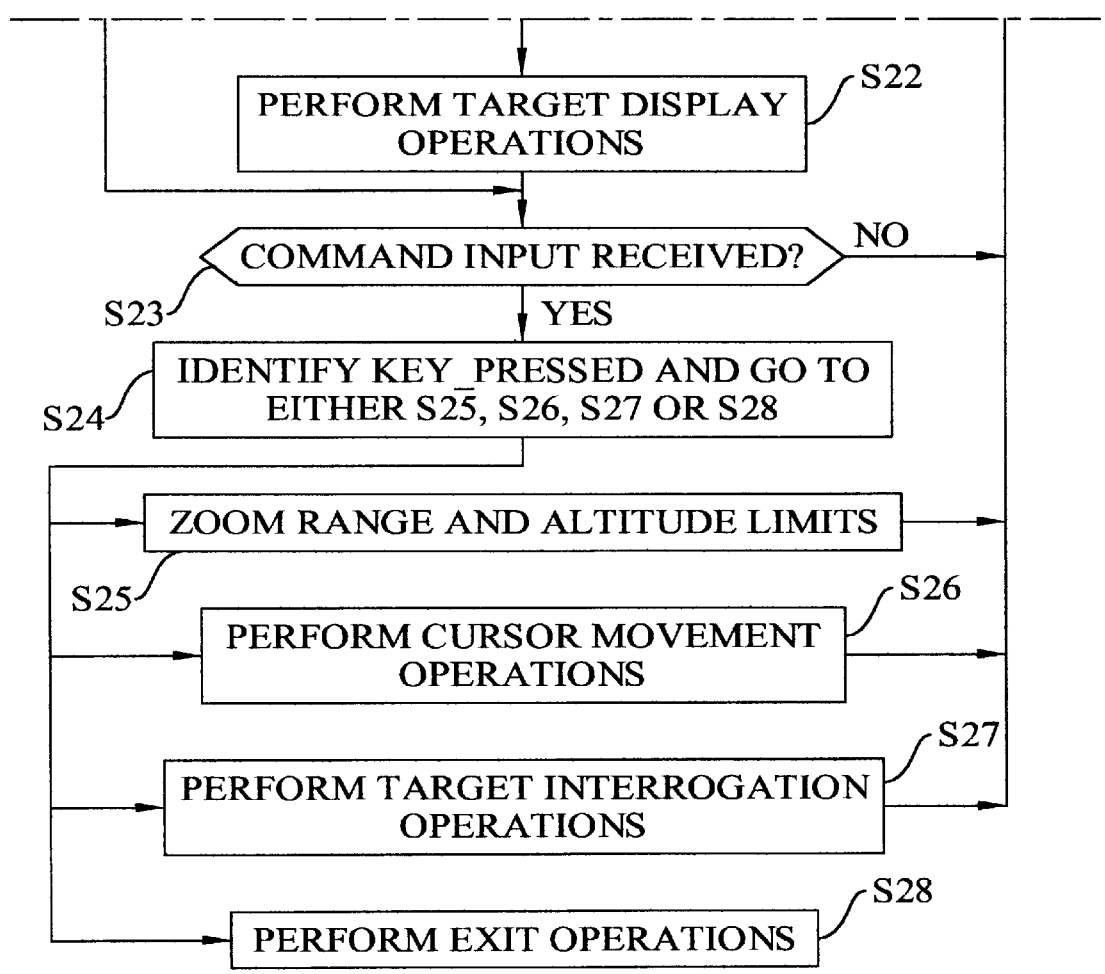

Referring to FIG. 6, a flow chart diagram illustrates an SPPI Process 100 including data processing operations or steps S1, . . . , S28.

Step S1 in FIG. 6 initializes the components on each optical scanner controller selected by address decoder 40 in FIG. 2.

Step S2 initializes ATC data interface card 17.

Step S3 includes defining memory storage buffers as dynamic linked lists. Initially a target buffer 1 is designated as TARGET_DISPLAY_LIST and a target buffer 2 is designated as TARGET_LOAD_LIST. TARGET_DISPLAY_LIST stores data for targets being displayed and TARGET_LOAD_LIST stores target data being obtained from the ATC data interface card. Data can be transferred from TARGET_LOAD_LIST to TARGET_DISPLAY_LIST by reversing the designation of target buffer 1 and target buffer 2.

Step S4 sets the contents of all memory locations in the random access memory of an optical scanner controller (e.g. RAM 41 of VCC 18A shown in FIG. 4) to a value of zero to remove all illuminated voxels from the three dimensional display.

Step S5 operations are performed to display reference images and a three dimensional cursor image from selected SPPI image files containing view coordinate data representative of reference images such as a cursor, a 50 mile range ring, a 100 mile range ring, a north azimuth symbol, and altitude reference indicators such as illustrated in FIG. 10.

In step S6 a sequential ATC data word is obtained from ATC interface card 17. ATC interface card 17 receives a serial sequence of data words from the ATC system and stores it in a buffer memory from which the data processor can retrieve data words in the order in which they are received.

In step S7 the ATC data word obtained in step S6 is tested to determine if the seven subsequent data words represent a target data packet: if NO, the word is discarded and step S6 is repeated; if YES, then SPPI process execution proceeds to step S8.

In step S8 the next seven 16-bit data words, WORD#1 to WORD#7, are obtained from the ATC interface card. WORD#1 represents the target azimuth, WORD#2 represents the target range, and WORD#6 represents the target altitude. Data words WORD#3, WORD#4, WORD#5, and WORD#7 include information about target identity. The IFF system can request information from target transponders according to various modes. Three of the modes are: Mode 1 which requests military targets to respond with one of 32 identity reply codes, Mode 2 which requests military targets to reply with one of 4096 identity reply codes, and Mode 3 which requests commercial targets to reply with one of 4096 identity reply codes. Other modes of the IFF system are not used in this example. WORD#7 indicates whether Mode 1, Mode 2, Mode 3 are present. WORD#3 provides Mode 1 data, if any. WORD#4 provides Mode 2 data, if any. WORD#5 provides Mode 3 data, if any.

In step S9 WORD#2 is tested to see if the target is within user selected range limits: if NO, then the data packet is discarded and execution of SPPI Process 100 returns to step S6; if YES, execution proceeds to step S10.

In step S10 WORD#6 is tested to see if the target is within user selected altitude and range limits: if NO, then the data packet is discarded and SPPI process execution returns to step S6; if YES, execution proceeds to step S11.

In step S11 an object designated as TARGET_DATA is diplayed. TARGET_DATA contains data and functions for displaying a target as a group of six voxels in three dimensional display volume B.

In step S12 ATC data words representing azimuth, range, and altitude are stored in TARGET_DATA. WORD#1 is stored as TARGET_DATA.AZIMUTH, WORD#2 is stored as TARGET_DATA.RANGE, and WORD#6 is stored as TARGET_DATA.ALTITUDE.

In step S13 ATC data words representing target identity information are stored in TARGET_DATA. If WORD#7 indicates the presence of Mode 1, then WORD#3 is stored as TARGET_DATA.SIF. If WORD#7 indicates the presence of Mode 2, then WORD#4 is stored as TARGET_DATA.SIF. If WORD#7 indicates the presence of Mode 3, then WORD#5 is stored as TARGET _DATA.SIF.

In step S14 the target azimuth, range, and altitude are used to calculate a corresponding (X, Y, Z) view coordinate coordinate within three dimensional display volume B.

In step S15 the (X, Y, Z) view coordinate is stored in TARGET_DATA as TARGET_DATA.LOCATION.

In step S16 the azimuth of the present target is compared to the azimuth of any immediately preceding target to determine if a new scan of the ATC system has begun (this occurs when the azimuth of the scan crosses North Azimuth which is at 360 and 0 degrees): if YES, then SPPI process execution goes to step S18; if NO, then SPPI process execution goes to step S17.

In step S17 TARGET_DATA is appended to the buffer designated as TARGET_LOAD_LIST. Each object in TARGET_LOAD_LIST is assigned an index i indicating target number within the current ATC scan. From step S17 SPPI process execution goes to step S23.

In step S23 SPPI a test to determines if operator input 14 (shown in FIG. 2) has been activated to input a command. For example, if operator input 14 is a keyboard, a command input will take the form of a keystroke or depressed key corresponding to the desired command. If no input has been activated, process execution returns to step S6. If an input has been received, process execution proceeds to step S24.

If a new ATC scan is detected in step S16, SPPI process execution transfers to step S18. In step S18 the buffer designated as TARGET_LOAD_LIST is redesignated as TARGET_DISPLAY_LIST, and the buffer previously designated as TARGET_DISPLAY_LIST is redesignated as TARGET_LOAD_LIST. In step S19 the buffer now designated as TARGET_LOAD_LIST is cleared for subsequent reuse.

In step S20 the three dimensional display is cleared as in step S4 above.

In step S21 the reference images and three dimensional cursor are redisplayed as in step S5 above.

Figure 7B:
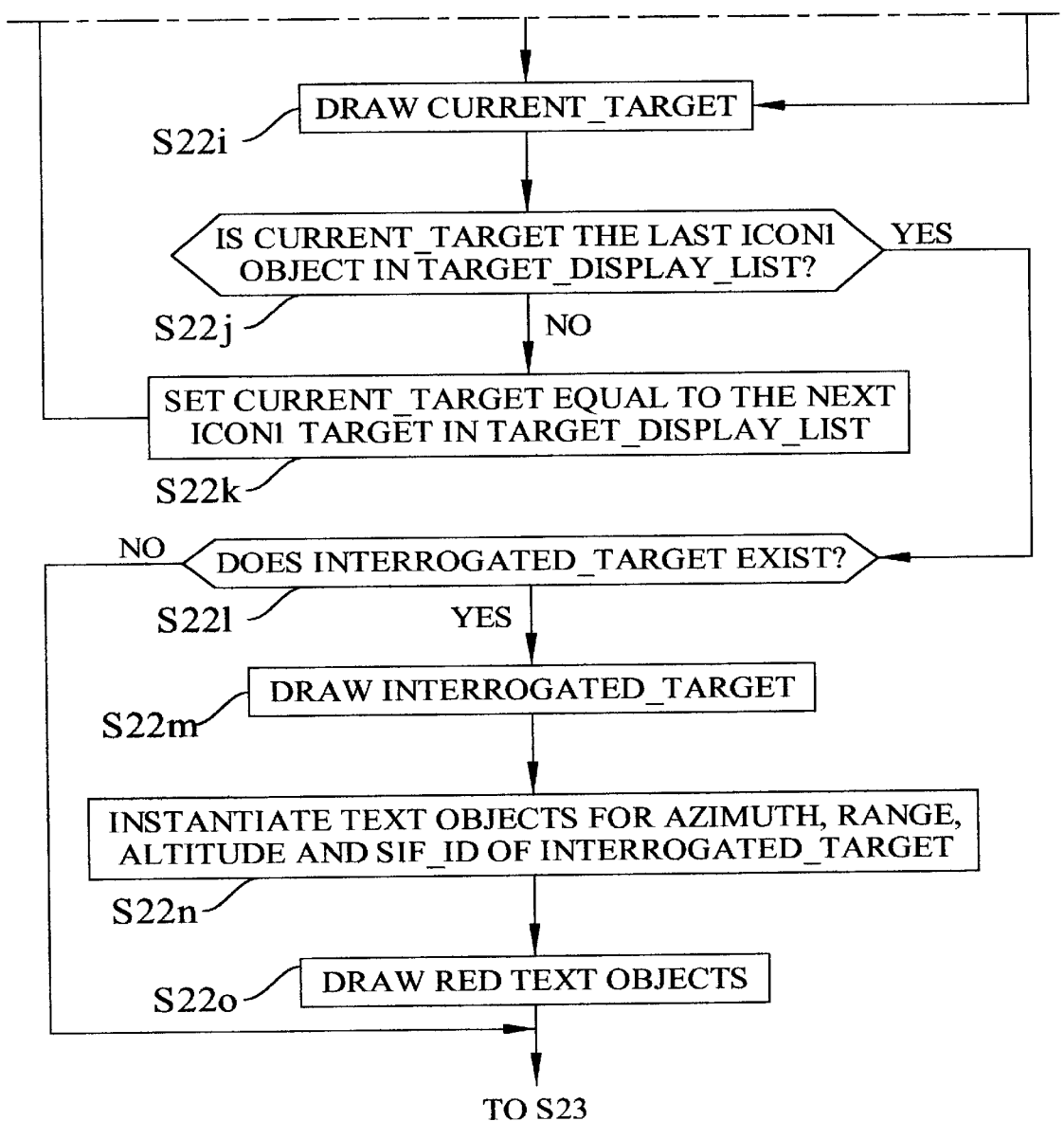

In step S22 targets are displayed from the information contained in TARGET_DISPLAY_LIST. The operations included in step S22 are illustrated in FIG. 7. In step S22a a variable designated CURRENT_TARGET is set equal to the first object in TARGET_DISPLAY_LIST. In step S22b identity code variable CURRENT_TARGET.SIF_ID is tested to see if the object designated by CURRENT_TARGET has been selected: if NO, the SPPI process execution proceeds to step S22i; if YES, the SPPI process execution proceeds to step S22c.

In step S22c a three dimensional image in the form of an aircraft is displayed. In step S22d the variable INTERROGATED_TARGET.SIF_ID is set equal to CURRENT_TARGET.SIF_ID. In step S22e the variable INTERROGATED_TARGET.AZIMUTH is set equal to CURRENT_TARGET.AZIMUTH. In step S22f the variable INTERROGATED_TARGET.RANGE is set equal to CURRENT_TARGET.RANGE. In step S22g the variable INTERROGATED_TARGET.ALTITUDE is set equal to CURRENT_TARGET.ALTITUDE. In step S22h the variable INTERROGATED_TARGET.LOCATION is set equal to CURRENT_TARGET.LOCATION. Steps S22c to S22h display an object representative of an aircraft having the information relevant to the selected target.

In step S22i a three dimensional image is displayed in the form of a generic target symbol which typically consists of about 6 voxels, although the number of voxels may be varied.

In step S22j TARGET_DISPLAY_LIST is tested to determine if CURRENT_TARGET is the last object in TARGET_DISPLAY_LIST. If YES, then execution proceeds to step S22l. If NO, then execution proceeds to step S22k. In step S22k CURRENT_TARGET is set equal to the next object in TARGET_DISPLAY_LIST, and execution returns to step S22b.

In step S22l a test is performed to determine if an object designated as INTERROGATED_TARGET has been instantiated. If YES, then execution proceeds to step S22m, and if NO, then execution proceeds to step S23.

In step S22m a three dimensional image in the form of an aircraft image is displayed at the location of the selected target.

In step S22n text strings are instantiated to indicate the azimuth, range, altitude, and identity code of the target selected for interrogation.

In step S22o the instantiated text strings are displayed within a selected portion of display volume B. From S22o program execution proceeds to step S23 illustrated in FIG. 6.

In step S23 SPPI process execution determines if operator input 14 (shown in FIG. 2) has been activated to input a command. For example, if operator input 14 is a keyboard, a command input will take the form of a keystroke or depressed key corresponding to the desired command. If no input has been activated, process execution returns to step S6. If an input has been received, process execution proceeds to step S24.

In step S24 the input command is identified according to the variable KEY_PRESSED. The value of the KEY_PRESSED variable is set by keyboard input, and a specific key is chosen to correspond to each of four command inputs: (1) Exit or program termination, (2) re-scaling (zoom) of range and altitude limits, (3) Cursor movement, or (4) Target Interrogation (Select Target). If program termination has been requested, process execution proceeds to step S28. If re-scaling (zoom) of range and altitude limits has been requested, process execution proceeds to step S25. If movement of the cursor has been requested, process execution proceeds to step S26. If Target Interrogation has been requested, process execution proceeds to step S27.

In step S25 operations are performed for zooming or re-scaling the three dimensional display by input of new altitude and range limits. Zoom operations include accepting new range and altitude limit inputs via operator input 14 and setting a flag variable. For example, a flag variable ZOOM set equal to value 1 may be used to indicate that non-default limits are to be implemented. The flag variable is tested subsequent to the detection of new ATC scan data in step S16 and altitude and range limits are reset if the flag variable has value 1. Default range limit is typically 100 miles and default altitude limits are 0 to 35,000 feet. Implementation of the zoom operations enables these values to be reset by operator command. From step S25 process execution returns to step S6.

Figure 8B:
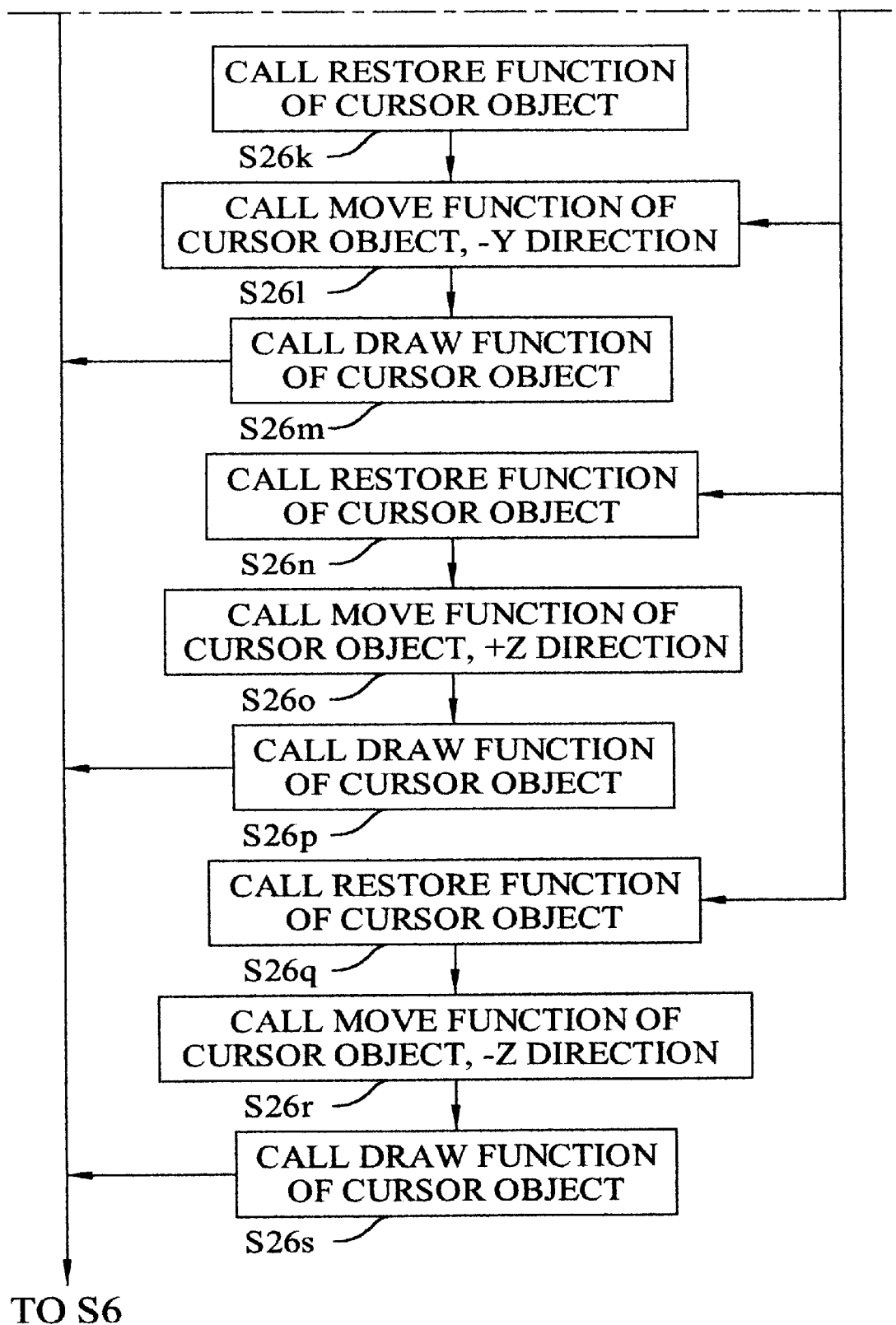

In step S26 operations are performed for moving the three dimensional cursor in accordance with operator commands input via command operator input 14 of FIG. 2. Operations included in step S26 are illustrated in FIG. 8.

In step S26a the direction of cursor movement indicated by the operator command is identified. Six possible directions are possible: +X, −X, +Y, −Y, +Z, and −Z. If operator input 14 is a keyboard, then each direction can be selected by depressing a corresponding key.

If the operator command is for +X direction movement, process execution proceeds to step S26b. In step S26b the three dimensional cursor is cleared from its initial position in the display volume and returns the voxel states (illuminated or blank) which were present prior to displaying the cursor.

In step S26c the cursor is instantiated at a new location. A default incremental value corresponding to about 0.25 inches in the X-direction of the three dimensional display space may be used, for example.

In step S26d the three dimensional cursor is displayed in the new location. The values of memory locations to be overwritten by the three dimensional cursor are saved in an array designated as SAVEPOINTS for later restoration as described above.

The operations in steps S26e, S26f and S26g are the same as for steps S26b, S26c and S26d respectively except that the three dimensional cursor is repositioned by an incremental movement in the −X direction. Likewise, the operations in steps S26h, S26i and S26j are the same as for steps S26b, S26c and S26d respectively except that the three dimensional cursor is repositioned an incremental movement in the +Y direction. Likewise, the operations in steps S26k, S26l and S26m are the same as for steps S26b, S26c and S26d respectively except that the three dimensional cursor is repositioned by an incremental movement in the −Y direction. Likewise, the operations in steps S26n, S26o and S26p are the same as for steps S26b, S26c and S26d respectively except that the three dimensional cursor is repositioned by an incremental movement in the +Z direction. Likewise, the operations in steps S26q, S26r and S26s are the same as for steps S26b, S26c and S26d respectively except that the three dimensional cursor is repositioned an incremental movement in the −Z direction.

After steps S26d, S26g, S26j, S26m, S26p and S26s execution proceeds to step S6.

Figure 9B:
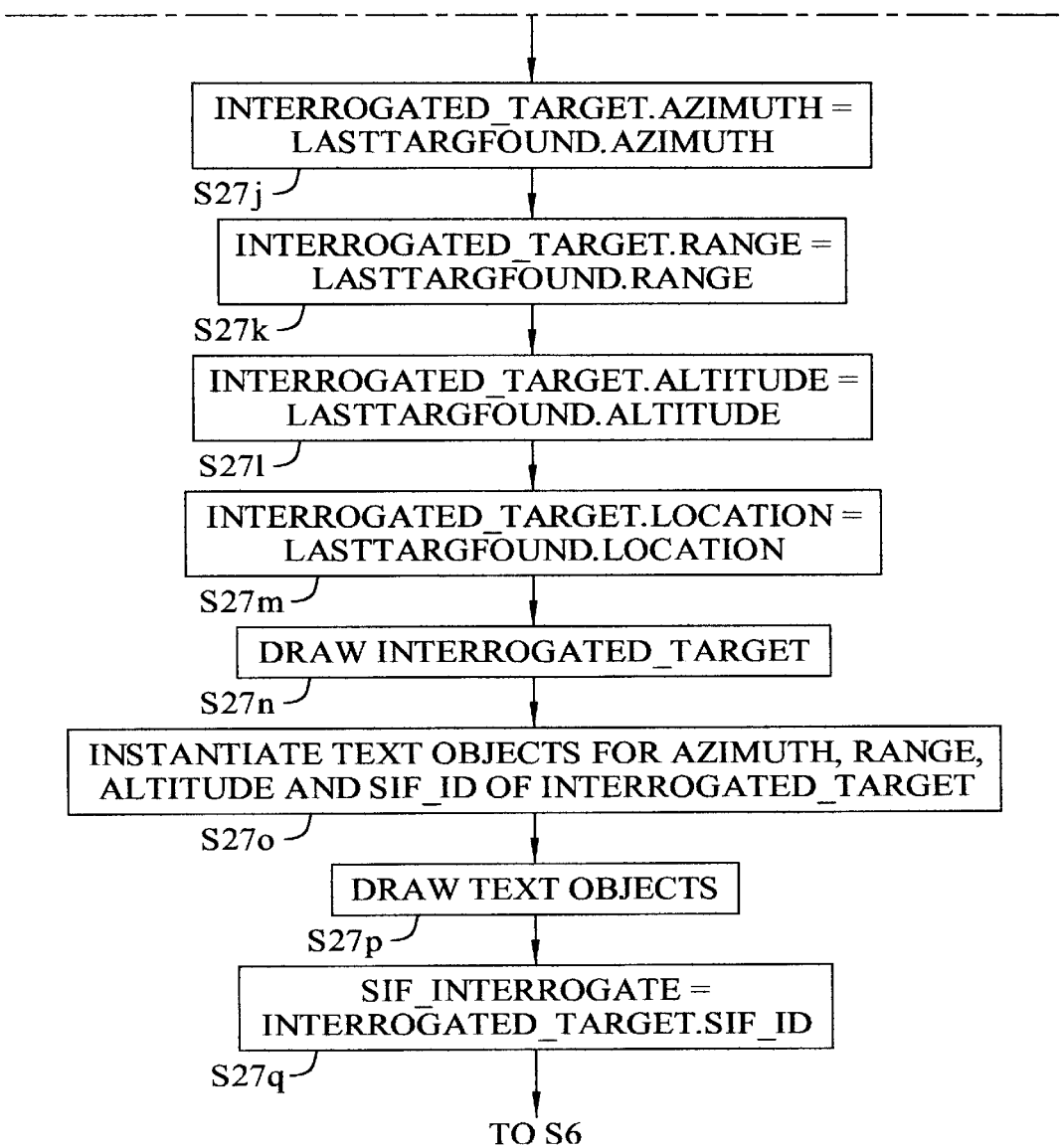

In step S27 of FIG. 6 operations are performed for selecting targets. A selected target displays range, altitude and identity information. In addition to displaying target information, the selected target is redisplayed as an aircraft image. Operations included in step S27 are illustrated in FIG. 9.

In step S27a the variable CURSOR_COORD is set equal to the "hot spot" of the three dimensional cursor. The hot spot is the selection location designated by the three dimensional cursor. As an example, for a three dimensional cursor which has the form of a cube, the hot spot would be the center of the cube. Variable CURSOR_COORD is a three dimensional coordinate location.

In step S27b the variable MIN_DISTANCE is set to an initial maximum value specified by variable MAX.

In step S27c an object designated CURRENT_TARGET is set equal to the first object in TARGET_DISPLAY_LIST.

In step S27d the vector difference between CURRENT_TARGET.LOCATION and variable CURSOR_COORD is determined and the magnitude of the vector difference is set equal to scalar variable DISTANCE.

In step S27e the variable DISTANCE is compared with the variable MIN_DISTANCE. If DISTANCE is smaller than MIN_DISTANCE, then MIN_DISTANCE is set equal to DISTANCE and the variable LASTTARGFOUND is set equal to CURRENT_TARGET. Otherwise, no operation is performed and execution proceeds to step S27f.

In step S27f TARGET_DISPLAY_LIST is tested to determine if CURRENT_TARGET represents the last object in the list. If YES, execution proceeds to step S27h. If NO, execution proceeds to step S27g.

In step S27g CURRENT_TARGET is set equal to the subsequent Icon1 object in TARGET_DISPLAY_LIST, and process execution returns to step S27d.

In step S27h an object designated as INTERROGATED_TARGET is instantiated. As noted previously, the INTERROGATED_TARGET object contains data and operations for displaying a three dimensional image having the form of an airplane.

In step S27i the identity variable INTERROGATED_TARGET.SIF_ID is set equal to LASTTARGFOUND.SIF_ID.

In step S27j the azimuth variable INTERROGATED_TARGET.AZIMUTH is set equal to LASTTARGFOUND.AZIMUTH.

In step S27k the range variable INTERROGATED_TARGET.RANGE is set equal to LASTTARGFOUND.RANGE.

In step S27l the altitude variable INTERROGATED_TARGET.ALTITUDE is set equal to LASTTARGFOUND.ALTITUDE.

In step S27m the three dimensional location variable INTERROGATED_TARGET.LOCATION is set equal to LASTTARGFOUND.LOCATION.

In step 27n an aircraft image is displayed at the desired location in the three dimensional image space.

In step S27o corresponding target data for azimuth, range, altitude and identity code of the selected target are instantiated.

In step S27p the target data are displayed in a selected region of the three dimensional display. Typically, the selected region for display of target data will be outside the region which represents the airspace occupied by aircraft targets.

In step S27q the identity code variable SIF_INTERROGATE is set equal to INTERROGATED_TARGET.SIF_ID. SIF_INTERROGATE is tested elsewhere in process execution so that targets previously selected for interrogation will be displayed when the three dimensional display is refreshed. Following step S27q process execution returns to step S6 illustrated in FIG. 6.

Step S28 of FIG. 6 is executed if a corresponding command input has been identified in step S24. In step S28 operations for terminating or exiting the three dimensional SPPI Operations are performed. These operations include clearing all images from the three dimensional SPPI display volume and de-allocating memory allocations made in step S3.

Three Dimensional SPPI Display

FIG. 10 illustrates exemplary features of a three dimensional SPPI display. Reference images include altitude reference indicators 61 (with symbols 61A and 61B), North Azimuth symbol 62, range ring 63 (with symbols 63A), and range ring 64 (with symbols 64A). The following examples represent suitable forms for the reference images, although others may be chosen as needed. Altitude reference indicators 61 may have the form of crosses and be centrally placed at positions representing 0, 5000, 10,000, 15,000, 20,000, 25,000, 30,000, and 35,000 feet. Symbols 61A and 61B may be provided to designate 0 and 35,000 feet indicators, respectively. A suitable north azimuth symbol 62 may be an "N" located at a position indicating the north extremity of the three dimensional display volume. Range ring 63 may be a ring image indicating a range of 50 miles relative to the center of the three dimensional display. Range ring 64 may be a ring image indicating a range of 100 miles relative to the center of the three dimensional display. Symbols 63A and 64A may be provided to designate range rings 63 and 64, respectively.

As examples, standard or generic target images 65 may shown as a number of illuminated voxels. Selected target image 66 may be in the form of an aircraft image or other representations as desired.

Text images 67 show ATC data corresponding to selected target image 66, and may be located in a three dimensional display volume which is outside the volume occupied by reference images and target images. Optionally, text images 67 may be proximate to the corresponding interrogated target image 66.

As an example, cursor 68 may have a three dimensional shape of a cube which is defined by illuminated voxels along the edges of the cube image. Other cursor shapes, such as a single point, a line, sphere, etc., may be selected as desired.

Azimuth, range and altitude of aircraft are represented by displaying target images at positions relative to reference images such as range rings, altitude indicators, and a north azimuth symbol. The three dimensional display of the present invention includes displaying a cursor positionable by operator command input for selecting or designating targets for interrogation, displaying selected target images representing targets, and displaying text images representing ATC data corresponding to selected targets.

Other modifications, variations, and applications of the present invention may be made in accordance with the above teachings other than as specifically described to practice the invention within the scope of the following claims.

We claim:

1. A three dimensional display system comprising:
   a display volume selectively partitioned into distinct display regions,
   a display surface coupled to said display volume for scattering light beams from within said display volume, at least two optical scanners coupled to said display surface for modulating intensity of said light beams and for deflecting said light beams to said display surface within said distinct display regions respectively, and a display controller comprising:
a world coordinate interface for inputting world coordinates,
a data processor coupled to said world coordinate interface for transforming said world coordinates into view coordinates and for transforming said view coordinates into device coordinates,
and an optical scanner controller coupled to said data processor for sensing and controlling motion of said display surface having a control memory for outputting beam deflector commands to said optical scanners to generate a three-dimensional image from said device coordinates;
wherein said data processor performs the steps of:
inputting world coordinates representative of an object to be displayed,
adjusting motion of said display surface within said display volume,
calculating a rotation angle of said display surface corresponding to a Y-coordinate of a voxel to be displayed;
finding a control memory location for an optical scanner corresponding to a Y-coordinate for each of said view coordinates;
calculating device coordinates from said view coordinates;
and loading said device coordinates into said control memory location, wherein the step of calculating device coordinates includes calculating device coordinates substantially from the following formulas:

if(q≡0) then $P''\_x=(P'\_x-X1\_chA)*((B4\_chA-B1\_chA)/(X4\_chA-X1\_chA))+B1\_chA$ $P''\_z=(P'\_z-Z3\_chA)*((A4\_chA-A3\_chA)/(Z4\_chA-Z3\_chA))+A3\_chA$ if(q≡1) then $P''\_x=(P'\_x-X1\_chB)*((B4\_chB-B1\_chB)/(X4\_chB-X1\_chB))+B1\_chB$ $P''\_z=(P'\_z-Z3\_chB)*((A4\_chB-A3\_chB)/(Z4\_chB-Z3\_chB))+A3\_chB$ else if(q≡2) then $P''\_x=(P'\_x-X1\_chC)*((B4\_chC-B1\_chB)/(X4\_chC-X1\_chC))+B1\_chC$ $P''\_z=(P'\_z-Z3\_chC)*((A4\_chC-A3\_chB)/(Z4\_chC-Z3\_chC))+A3\_chC$ else $P''\_x=(P'\_x-X1\_chD)*((B4\_chB-B1\_chD)/(X4\_chD-X1\_chD))+B1\_chD$ $P''\_z=(P'\_z-Z3\_chD)*((A4\_chB-A3\_chD)/(Z4\_chD-Z3\_chD))+A3\_chD$ for a voxel P″ having components x, y, and z in a quadrant q where B1, B4, A3, A4 are device coordinate limits and X1, X4, Z3 and Z4 are view coordinate limits for each of optical scanners (ch) A, B, C, and D, respectively.

2. A three dimensional display system comprising:
a display volume selectively partitioned into distinct display regions,
a display surface coupled to said display volume for scattering light beams from within said display volume,
at least two optical scanners for modulating said light beams and for directing said light beams to said display surface within said distinct display regions respectively,
and a display controller comprising:
a world coordinate interface for inputting world coordinates,
an optical scanner controller coupled to said data processor for sensing and controlling motion of said display surface and for controlling said optical scanners wherein each said optical scanner deflects said light beam to a sequence of selected locations on said display surface;
and further comprising a light beam source wherein said light beam source is an angular combiner coupled to a red, a green, and a blue laser for generating said light beams in color and a modulator coupled to each said laser for selecting said color;
wherein said display surface has a periodic motion that is one of rotation and reciprocation;
wherein said display surface has a shape that is one of a rectangle, a helix, a multiple helix, and an ellipse;
wherein said display volume comprises at least one of a gas, a liquid, and a solid material;
wherein said optical scanner controller comprises:
an address decoder for receiving address words from said data processor and for outputting read and write control commands to said control memory;
an I/O control circuit coupled to said data processor for matching data bus widths between said data processor and said optical scanner controller;
a dual port random access memory (RAM) constituting said control memory coupled to said I/O control circuit and said address decoder having two independently addressable ports;
an address counter coupled to said random access memory, said data processor, and said address decoder for selecting initial and incremental memory locations from one said port of said random access memory;
a programmable timer coupled to said address counter for providing clock pulses in response to an angle index signal from said display surface;
an output buffer register coupled to said random access memory for outputting deflection commands to said optical scanners;
a shaft counter coupled to said timer for counting rotations of said display surface to determine speed of rotation of said display surface;
a shaft register coupled to said shaft counter and to said address decoder for initializing said shaft counter;
a motor register coupled to said data processor and said address decoder for outputting motor speed data;
and a D/A converter coupled to said motor register for outputting a control voltage to a motor for causing said display surface to rotate at a selected speed;
wherein said data processor performs the steps of:
inputting world coordinates representative of an object to be displayed, transforming said world coordinates into view coordinates, adjusting motion of said display surface within said display volume, and controlling said optical scanner to generate said three-dimensional image within said display volume;

wherein said data processor further performs the steps of:

finding a control memory location of a light beam deflector corresponding to a Y-coordinate for each said view coordinate;

calculating X-axis and Z-axis device coordinates from said view coordinate;

wherein the step of calculating said control memory location includes substantially the following formula:

$$m = \left[\frac{1}{\pi}\tan^{-1}\left\{\frac{z}{x}\right\} + \left(\frac{y}{h}\right)\right] \cdot \text{MAX}$$

where m is a control memory location, y is a Y-axis view coordinate, x is an X-axis view coordinate, z is a Z-axis view coordinate, and MAX is a total of addressable Y-axis positions;

and loading said device coordinates into said control memory location;

wherein the step of calculating device coordinates includes substantially the following formulas:

if(q=0) then $P''\cdot x = (P'\cdot x - X1\_chA)*((B4\_chA-B1\_chA)/(X4\_chA-X1\_chA)) + B1\_chA$ $P''\cdot z = (P'\cdot z - Z3\_chA)*((A4\_chA-A3\_chA)/(Z4\_chA-Z3\_chA)) + A3\_chA$ if(q=1) then $P''\cdot x = (P'\cdot x - X1\_chB)*((B4\_chB-B1\_chB)/(X4\_chB-X1\_chB)) + B1\_chB$ $P''\cdot z = (P'\cdot z - Z3\_chB)*((A4\_chB-A3\_chB)/(Z4\_chB-Z3\_chB)) + A3\_chB$ else if(q=2) then $P''\cdot x = (P'\cdot x - X1\_chC)*((B4\_chC-B1\_chB)/(X4\_chC-X1\_chC)) + B1\_chC$ $P''\cdot z = (P'\cdot z - Z3\_chC)*((A4\_chC-A3\_chB)/(Z4\_chC-Z3\_chC)) + A3\_chC$ else $P''\cdot x = (P'\cdot x - X1\_chD)*((B4\_chB-B1\_chD)/(X4\_chD-X1\_chD)) + B1\_chD$ $P''\cdot z = (P'\cdot z - Z3\_chD)*((A4\_chB-A3\_chD)/(Z4\_chD-Z3\_chD)) + A3\_chD$ for a voxel P" having components x, y, and z in one of said distinct display regions q where B1, B4, A3, A4 are device coordinate limits and X1, X4, Z3 and Z4 are view coordinate limits for each of optical scanners (ch) A, B, C, and D, respectively.

* * * * *